US011297800B2

(12) United States Patent
Paxton et al.

(10) Patent No.: US 11,297,800 B2
(45) **Date of Patent: *Apr. 12, 2022**

(54) TRAIL BOOT WITH MOLDED LINER AND ADJUSTABLE METATARSAL AND METACARPAL PAD

(71) Applicant: Hyper Pet Brands LLC, Wayne, PA (US)

(72) Inventors: Stephen E. Paxton, Brainerd, MN (US); Lisa M. Lugo-Paxton, Brainerd, MN (US)

(73) Assignee: COSMIC PET BRANDS LLC, Wayne, PA (US)

( * ) Notice: Subject to any disclaimer, the term of this patent is extended or adjusted under 35 U.S.C. 154(b) by 158 days.

This patent is subject to a terminal disclaimer.

(21) Appl. No.: 16/354,092

(22) Filed: Mar. 14, 2019

(65) Prior Publication Data

US 2019/0281793 A1 Sep. 19, 2019

Related U.S. Application Data

(63) Continuation-in-part of application No. 15/955,642, filed on Apr. 17, 2018, now Pat. No. 10,238,089, (Continued)

(51) Int. Cl.
*A01K 13/00* (2006.01)
*A43B 13/22* (2006.01)
(Continued)

(52) U.S. Cl.
CPC .............. *A01K 13/007* (2013.01); *A43B 3/00* (2013.01); *A43B 13/14* (2013.01); *A43B 13/223* (2013.01)

(58) Field of Classification Search
CPC .. A01K 13/006; A01K 13/007; A43B 7/1465; A43B 13/223
(Continued)

(56) References Cited

U.S. PATENT DOCUMENTS

| | | | |
|---|---|---|---|
| 295,712 | A | 3/1884 | Anderson |
| 630,310 | A | 8/1899 | Agnew |

(Continued)

FOREIGN PATENT DOCUMENTS

| | | | |
|---|---|---|---|
| CA | 2486628 | C | 6/2015 |
| JP | 2004254606 | A | 9/2004 |

(Continued)

*Primary Examiner* — Sharon M Prange
(74) *Attorney, Agent, or Firm* — Global IP Counselors, LLP

(57) ABSTRACT

A canine trail boot has a molded sole with raised lugs that divide the sole into individual pad cups that each receive a single pad from a dog foot. Independent movement between adjacent pad cups better replicates a dog's pad movement. The molded sole may include a toe having unidirectional treads, a tail having a combination of treads that also receive and retain straps, and a cushioning pad that protrudes into and engages with an indentation on a dog's paw to retain a boot securely. The sole interior may be layered with insoles that provide puncture resistance, heat isolation or reflection, and other custom interior features, or a liner may be provided that may also further incorporate the raised cushioning pad. The cushioning pad may be longitudinally adjustable within the boot interior, to tailor the cushioning pad to the ideal position to engage with a dog's metatarsal or metacarpal pad.

11 Claims, 25 Drawing Sheets

Related U.S. Application Data which is a continuation-in-part of application No. 15/802,316, filed on Nov. 2, 2017, now Pat. No. 9,943,065, which is a continuation of application No. 15/497,187, filed on Apr. 25, 2017, now abandoned, which is a continuation-in-part of application No. 15/246,524, filed on Aug. 24, 2016, now abandoned, which is a continuation-in-part of application No. 14/642,743, filed on Mar. 9, 2015, now abandoned.

(60) Provisional application No. 62/659,090, filed on Apr. 17, 2018, provisional application No. 62/643,161, filed on Mar. 14, 2018, provisional application No. 62/250,462, filed on Nov. 3, 2015, provisional application No. 61/949,240, filed on Mar. 7, 2014.

(51) Int. Cl.
*A43B 3/00* (2022.01)
*A43B 13/14* (2006.01)

(58) Field of Classification Search
USPC ........................................................ 36/111
See application file for complete search history.

(56) References Cited

U.S. PATENT DOCUMENTS 866,423 A 9/1907 Bellatty
1,061,353 A * 5/1913 Block .................... A43B 7/22 36/163
1,354,972 A 10/1920 Hess
1,595,834 A 8/1926 Griffiths
1,656,564 A 1/1928 Lyon
1,687,459 A 10/1928 Lyon
1,687,460 A 10/1928 Lyon
1,772,827 A 8/1930 Caster-Udell
1,854,183 A 4/1932 Fallon, Jr.
1,911,956 A 5/1933 Jennings
1,961,345 A 6/1934 Fallon, Jr.
2,004,117 A 6/1935 Jennings
2,064,566 A 12/1936 Richman
2,201,382 A 5/1940 Vizard
2,222,705 A 11/1940 Conlon
2,311,925 A * 2/1943 Boos .................. A43B 7/1465 36/163
2,408,650 A 10/1946 Jennings
2,417,803 A 3/1947 Mar
2,424,172 A * 7/1947 Huddleston .......... A01K 13/007 36/111
2,443,831 A 6/1948 Miller
2,446,371 A 8/1948 Jones
2,535,394 A 12/1950 Davis
2,651,853 A 9/1953 Lewis
2,700,231 A 1/1955 Vizard
2,754,600 A 7/1956 Vizard
2,937,487 A 5/1960 Dever
3,150,641 A 9/1964 Kesh
3,286,375 A 11/1966 Troy
3,304,630 A 2/1967 Sherbrook
3,742,679 A 7/1973 Jordan
3,747,565 A 7/1973 Kellam
3,762,073 A 10/1973 Cantales
D229,197 S 11/1973 Jackson
3,791,383 A 2/1974 Friedman
3,794,119 A 2/1974 Paiso et al.
4,045,888 A * 9/1977 Oxenberg ................ A43B 5/00 36/114
4,457,261 A 7/1984 Marshall
4,458,431 A * 7/1984 Sinclair ................. A43B 11/00 36/111
4,543,911 A 10/1985 Marshall
4,548,026 A 10/1985 Shidner
4,633,817 A 1/1987 Taylor
4,744,333 A 5/1988 Taylor
4,931,773 A 6/1990 Rosen
4,938,753 A 7/1990 Van Gompel et al.
4,967,542 A 11/1990 MacDonald
5,014,041 A 5/1991 Rosen
5,076,043 A 12/1991 Butler
5,137,508 A 8/1992 Engman
5,148,657 A * 9/1992 Stafford ............... A01K 13/007 168/1
5,209,048 A 5/1993 Hanson
5,211,672 A 5/1993 Andujar
5,341,765 A 8/1994 McComb
5,359,963 A 11/1994 Jesse, Jr. et al.
5,385,036 A 1/1995 Spillane et al.
5,408,812 A 4/1995 Stark
5,452,685 A 9/1995 Thomas
5,490,337 A 2/1996 Zerbinati
5,495,828 A 3/1996 Solomon et al.
D379,251 S 5/1997 Mezey
5,633,064 A 5/1997 Ragland et al.
5,658,634 A 8/1997 Ragland et al.
5,676,095 A 10/1997 Ralls
D387,511 S 12/1997 Caditz
5,715,661 A 2/1998 Meyers
5,813,144 A 9/1998 Prengler
5,926,843 A 7/1999 Winchester
5,937,542 A 8/1999 Bourdeau
5,983,526 A 11/1999 Pavlik et al.
5,996,255 A 12/1999 Ventura
6,024,055 A 2/2000 Jesse, Sr et al.
6,089,194 A 7/2000 Labelle
6,186,097 B1 2/2001 Brockmann et al.
6,226,898 B1 5/2001 Trimble et al.
6,240,882 B1 6/2001 Gross
6,319,864 B1 11/2001 Hannigan et al.
6,470,832 B1 10/2002 Peacock
6,526,920 B1 3/2003 Griffin
6,546,704 B1 4/2003 Fisher
6,564,475 B2 5/2003 Collins et al.
6,564,753 B1 5/2003 Heileg et al.
6,786,029 B2 9/2004 Kuzuu
6,851,394 B1 2/2005 Young
6,863,033 B1 3/2005 Fleming
6,931,767 B2 8/2005 Royle
6,973,742 B2 12/2005 Gordon
7,174,858 B2 2/2007 Ford
7,185,612 B2 3/2007 Faulk
7,677,206 B1 3/2010 Southworth
7,971,557 B2 7/2011 Paxton et al.
7,975,656 B2 7/2011 Prill
8,109,241 B2 * 2/2012 Wrenwood Maloney .................. A01K 13/007 119/850
8,113,152 B1 2/2012 Paxton et al.
8,161,668 B2 4/2012 Ketzenberg et al.
8,176,880 B2 5/2012 Hurwitz
8,424,495 B2 4/2013 Rivera-Brutto
8,567,350 B2 10/2013 Wrenwood Maloney et al.
8,621,765 B2 1/2014 Geer et al.
8,677,944 B2 3/2014 Kissel, Jr.
D702,893 S 4/2014 Tulio
9,485,962 B2 11/2016 Paxton et al.
9,497,932 B1 11/2016 Paxton et al.
9,629,336 B1 4/2017 Paxton et al.
9,943,065 B1 4/2018 Paxton et al.
10,238,089 B1 3/2019 Paxton et al.
2003/0115777 A1 6/2003 Hall et al.
2005/0092260 A1 5/2005 Paxton et al.
2005/0188925 A1 9/2005 Yun et al.
2005/0241188 A1 * 11/2005 Yun ..................... A01K 13/007 36/111
2006/0059726 A1 * 3/2006 Song ................... A43B 7/1435 36/142
2006/0207296 A1 9/2006 Fujikawa
2007/0039565 A1 2/2007 Krottinger
2007/0044734 A1 3/2007 Maloney et al.
2007/0175409 A1 8/2007 Vogelman
2007/0175410 A1 8/2007 Vogelman
2008/0264351 A1 10/2008 Williams
2009/0012490 A1 1/2009 Winqvist

(56) References Cited

U.S. PATENT DOCUMENTS

| | | | | |
|---|---|---|---|---|
| 2009/0266310 | A1 | 10/2009 | Behre | |
| 2010/0211034 | A1 | 8/2010 | Fish et al. | |
| 2010/0247846 | A1 | 9/2010 | Erickson | |
| 2011/0041779 | A1* | 2/2011 | Hurwitz | A01K 13/007 119/850 |
| 2011/0041780 | A1 | 2/2011 | Hurwitz | |
| 2011/0265733 | A1* | 11/2011 | Paxton | A01K 13/007 119/850 |
| 2011/0277702 | A1 | 11/2011 | Taslakian | |
| 2012/0010584 | A1 | 1/2012 | Schmidt | |
| 2012/0180441 | A1* | 7/2012 | Lander | A01K 13/007 54/82 |
| 2014/0150299 | A1 | 6/2014 | Entler | |
| 2014/0173940 | A1* | 6/2014 | Drennan | A43B 7/1455 36/102 |
| 2014/0174379 | A1 | 6/2014 | Kissel, Jr. | |
| 2014/0318478 | A1 | 10/2014 | Cruz | |

FOREIGN PATENT DOCUMENTS

| | | | |
|---|---|---|---|
| KR | 200371823 | Y1 | 1/2005 |
| WO | 2007051121 | A2 | 5/2007 |
| WO | 2009120723 | A2 | 10/2009 |
| WO | 2014071462 | A1 | 5/2014 |

* cited by examiner

Fig. 18
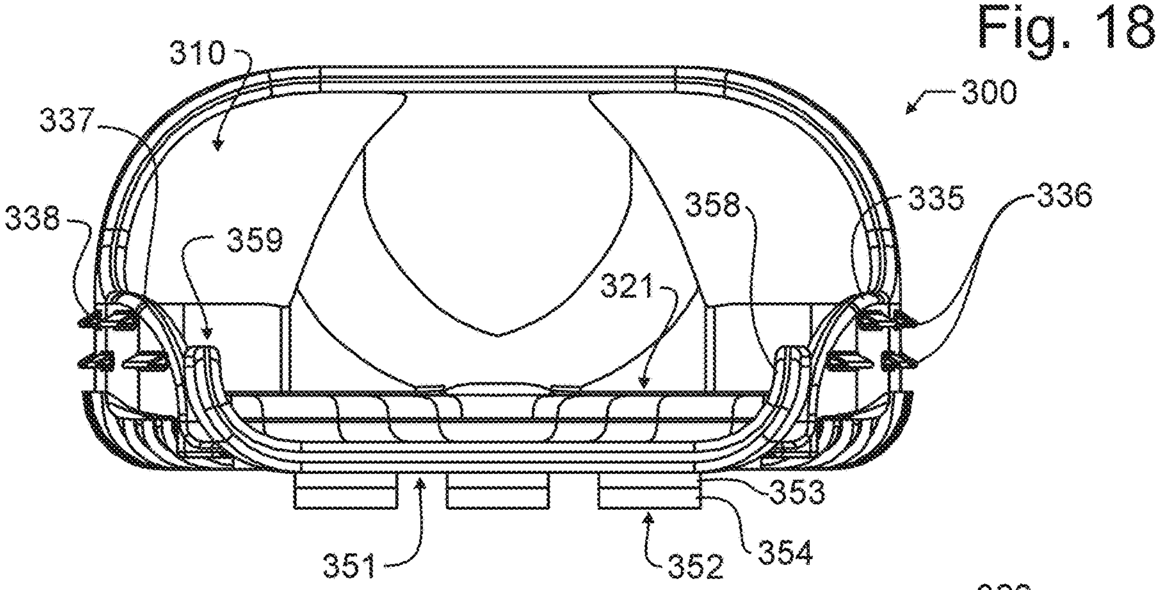
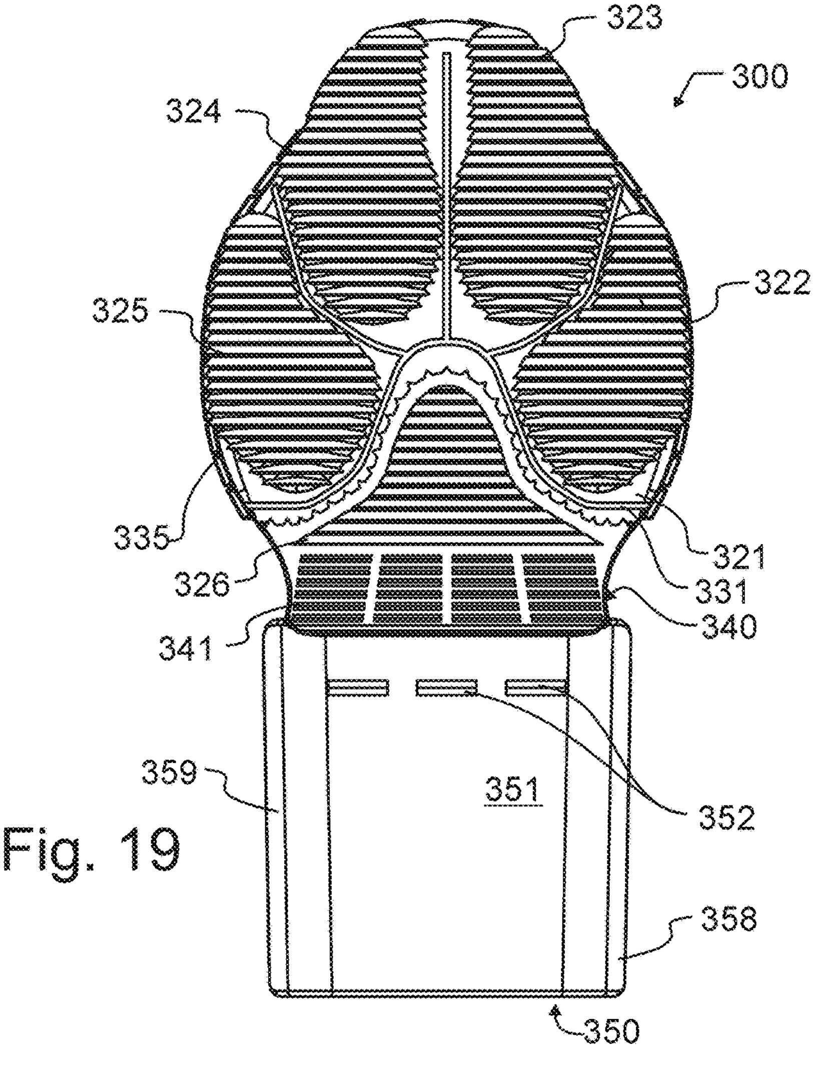
Fig. 19

Fig. 36
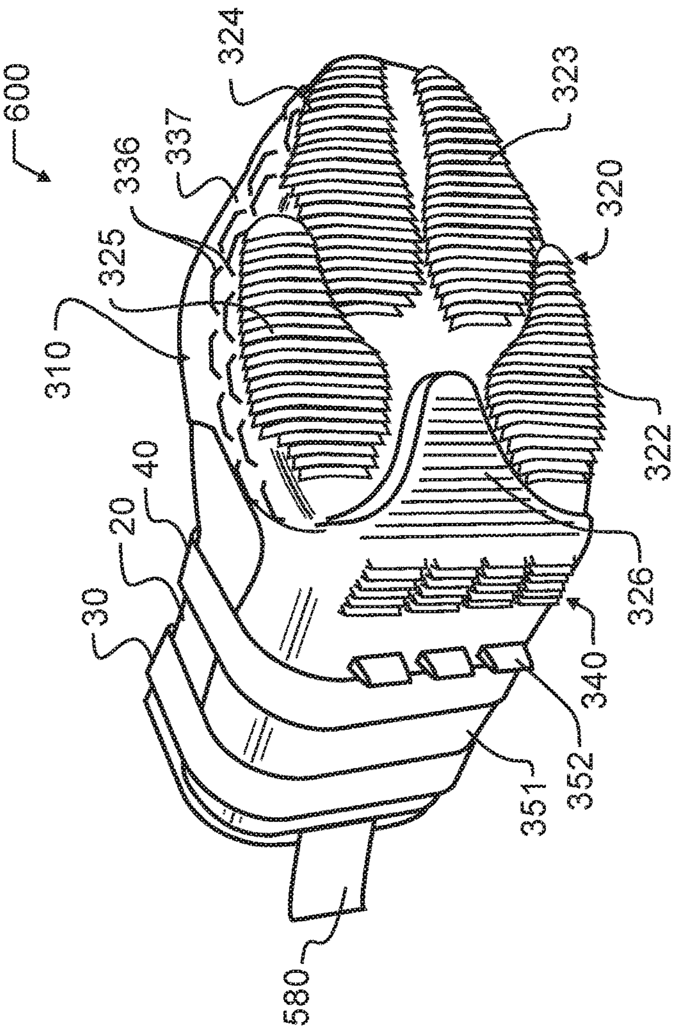
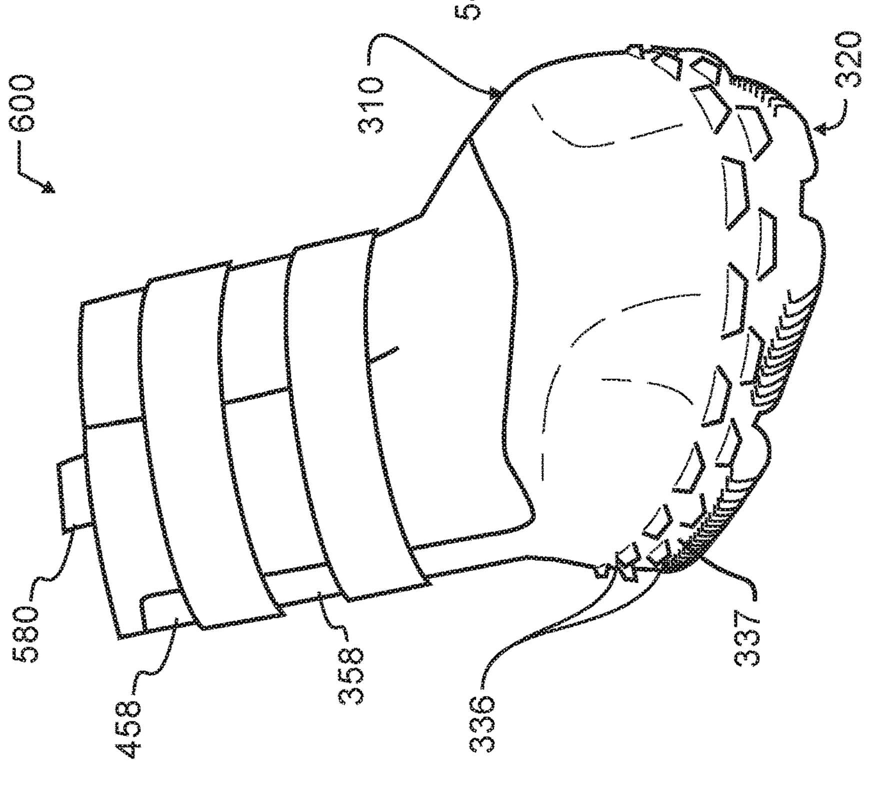
Fig. 35

TRAIL BOOT WITH MOLDED LINER AND ADJUSTABLE METATARSAL AND METACARPAL PAD

BACKGROUND OF THE INVENTION

1. Field of the Invention

This invention pertains generally to the field of animal husbandry, and more particularly to protective dog boots.

2. Description of the Related Art

Dogs have long been known as "man's best friend". Not only do dogs provide companionship, they are also intelligent and readily taught to carry out many tasks that are complementary to those of other public servants. As a result, they can provide great benefit, often times in situations where humans would not be capable. These animals serve very diverse functions, providing companionship, guarding, towing, hunting, rescue, and even sensory conversion, such as a seeing eye-dog or a hearing-assist dog. They may be pets, or may be put in service by individuals or organizations such as search and rescue teams, police, or military organizations.

Regardless of the relationship between person and dog, at various times, and for many diverse reasons, it may be highly desirable for the dog owner to place boots upon the dog's paws. For example, in inclement weather a person may not wish to try to clean a dog's paws after the dog has been outside. Boots that may be placed and then readily removed may be much easier to use than what might be required to thoroughly clean the dog's feet. In other instances, a dog may have injured one or more paws, and so may not have the usual toughness. In such case, a suitable boot may help to protect the affected paw until sufficient healing has occurred to no longer require the boot. In other cases, the dog's pads may be inadequate for traversing the ground when temperatures are particularly severe, such as in colder climates or with dogs that are not adapted to the cold, or conversely in extremely hot climates where the ground surface may be scorching. Racing and sled dogs may be exposed to a particularly harsh course or environment, and so may also need special protection. Boots can be used to prevent snow from getting up between the pads of the foot, freezing, abrading the soft tissue, and thereby producing a lame dog. A dog's paws are also not well designed for traction on a variety of hard surfaces, such as smooth rocks, ice, finished wood, various harder plastics, and the like. Boots can provide substantial traction on such surfaces.

A number of artisans have recognized one or more of the foregoing needs, and so have designed various dog boots. One such patent which exemplifies these known boots is U.S. Pat. No. 6,526,920 by Griffin, entitled "Dog boot for hunting and other outdoor activities," the teachings which are incorporated herein by reference. This patent describes dog boots having a zipper and dual hook-and-loop leg fasteners with loops for tightening, and a non-skid sole. Additional patents that offer useful teachings and insights are incorporated by reference, including U.S. patents Des. 379,251 by Mezey, entitled "Boot for a dog"; Des. 387,511 by Caditz, entitled "Bootie for a canine"; U.S. Pat. No. 2,064,566 by Richman, entitled "Bootie for a canine"; U.S. Pat. No. 2,651,853 by Lewis, entitled "Animal boot with adhesive tape securing means"; U.S. Pat. No. 3,762,073 by Cantales, entitled "Disposable plastic leggings for dogs"; U.S. Pat. Nos. 4,457,261 and 4,543,911 by Marshall, each entitled "Mittens for canines"; U.S. Pat. No. 4,458,431 by Sinclair, entitled "Boot for pet animal"; U.S. Pat. No. 4,967,542 by MacDonald, entitled "Dog boots"; U.S. Pat. No. 5,408,812 by Stark, entitled "Dog boot"; U.S. Pat. No. 5,148,657 by Stafford et al, entitled "Dog boot"; U.S. Pat. No. 5,452,685 by Thomas, entitled "Dog booties"; U.S. Pat. No. 6,470,832 by Peacock, entitled "Animal boots"; U.S. Pat. Nos. 8,109,241 and 8,567,350 by Wrenwood Maloney et al, entitled "Dog boot"; and US published application 2011/0041779 by Hurwitz, entitled "Therapeutic pet boot".

However, these prior art boots tend to suffer from several common limitations. As may be recognized, prior art dog boots are often very difficult to put on the dog's foot. This problem will be intensified by the fact that most dogs will not remain still while a person is trying to put the boot on. Once on, these prior art boots do not stay on well. Many will simply spin about, potentially causing much discomfort or harm to the dog. Others will slide off as the dog walks or runs, much like loose socks coming off of a person walking on carpet. This phenomenon is quite significant, since the boot must be designed to be of non-slip material, or the dog will sprawl on finished wood, icy or other relatively slippery surfaces. Yet, the boot must also preferentially stay on the dog's paw, rather than slide with respect thereto, even when the booted dog is traversing terrain having good traction. Simply applying more force about the dog's leg to keep the boot on has proven to be totally unsatisfactory, since circulation within the leg may become limited or disrupted. Unintended bunching of the boot top can be harder to detect, and can also restrict circulation. Yet, different dogs will have significantly different proportions between pad size and leg diameter, meaning that the boot must be very adjustable to accommodate different dog breeds and sizes. Finally, complex boots are not only more difficult to put on the dog, but they are also much more expensive to produce, which is also undesirable.

While many different types of human boots and those for other diverse animals such as horses have been devised, boots from these anatomically diverse animals have found little practical utility with dogs. In the leg of any human or animal, when a boot or covering is applied, circulation must be preserved. In the case of a human foot, this can easily be achieved by not over-tightening the laces or other bindings, and instead relying upon the approximately ninety-degree bend between the human leg and foot, and the bulging calcaneus bone. The human leg dramatically increases in diameter due to the calcaneus bone. Consequently, a wrap about the lower leg including the tibia and fibula will not pass around or "slide past" the calcaneus or heel bone.

In contrast to the human foot skeletal structure, a dog walks "tip-toe" compared to a human. The dog foot is of much more consistent diameter, and does not have a bulge such as found in the human calcaneus bone. Consequently, the shape of a dog foot causes prior art boots to be readily slipped off by the dog during ordinary movement, and human boots have no co-operative anatomy similar to the human calcaneus or heel bone in the dog foot with which to engage.

A front dog paw, left-to-right, has almost no dimensional change. The dog leg does not suddenly expand into a much larger paw, but instead remains very close in size and diameter. The exact dimensions of dog legs and paws vary among different dog breeds, but it is important to recognize that many breeds have very little change in diameter along the length of the dog foot, and so the calcaneus human bone is not available on the "tip-toe" dog leg.

A number of artisans discuss such materials as leather, neoprene, and PVC for applications similar to those for which the present invention is intended. These patents, the contents which are incorporated herein by reference, include U.S. Pat. No. 2,424,172 by Huddleston, entitled "Animal boot"; U.S. Pat. No. 2,535,394 by Davis, entitled "Shoe for hunting dogs"; U.S. Pat. No. 5,495,828 by Solomon et al, entitled "Animal boots with detachable, vertically adjustable fastening strap"; U.S. Pat. No. 6,186,097 by Brockmann et al, entitled "Protection shoe for the paw of a dog"; U.S. Pat. No. 6,526,920 by Griffin, entitled "Dog boot for hunting and other outdoor activities" and mentioned herein above; U.S. Pat. No. 6,786,029 by Kuzuu, entitled "Pet nail cover"; and U.S. Pat. No. 6,931,767 by Royle, entitled "Foot cover". While these materials provide improved protection over prior art fabrics, they are inadequate to maintain desired temperature differentials, and they suffer from many of the drawbacks already mentioned herein above.

Additional patents for which the teachings are incorporated herein by reference include: U.S. Pat. No. 295,712 by Anderson, entitled "Horse Armor"; U.S. Pat. No. 630,310 by Agnew, entitled "Veterinary poultice boot"; U.S. Pat. No. 866,423 by Bellatty, entitled "Safety tread"; U.S. Pat. No. 1,354,972 by Hess, entitled "Shoe"; U.S. Pat. No. 1,595,834 by Griffiths, entitled "Animal apparel"; U.S. Pat. No. 1,656,564 by Lyon, entitled "Welting and method of making the same"; U.S. Pat. No. 1,687,459 by Lyon, entitled "Welt and method of making the same"; U.S. Pat. No. 1,687,460 by Lyon, entitled "Beaded welting and method of making"; U.S. Pat. No. 1,772,827 by Caster-Udell, entitled "Dog blanket"; U.S. Pat. No. 1,854,183 by Fallon, Jr., entitled "Method of making cork welting"; U.S. Pat. No. 1,911,956 by Jennings, entitled "Welting and method of producing it"; U.S. Pat. No. 1,961,345 by Fallon, Jr., entitled "Beaded welting and method of making the same"; U.S. Pat. No. 2,004,117 by Jennings, entitled "Welting and method of producing welting"; U.S. Pat. No. 2,201,382 by Vizard, entitled "Welt"; U.S. Pat. No. 2,222,705 by Conlon, entitled "Dog cover"; U.S. Pat. No. 2,408,650 by Jennings, entitled "Water-resistant shoe"; U.S. Pat. No. 2,417,803 by De Mar, entitled "Dog's garment"; U.S. Pat. No. 2,443,831 by Miller, entitled "Protective garment for animals"; U.S. Pat. No. 2,446,371 by Jones, entitled "Dog boot"; U.S. Pat. No. 2,700,231 by Vizard, entitled "Beaded shoe welting"; U.S. Pat. No. 2,754,600 by Vizard, entitled "Shoe welting"; U.S. Pat. No. 2,937,487 by Dever, entitled "Leg sheath"; U.S. Pat. No. 3,150,641 by Kesh, entitled "Dust cover for dog"; U.S. Pat. No. 3,286,375 by Troy, entitled "Boot having pants leg retaining means"; U.S. Pat. No. 3,304,630 by Sherbrook, entitled "Wrap-around wedge welt for goodyear welt construction"; U.S. Pat. No. 3,742,679 by Jordan, entitled "Stretchable pet suit with boots"; U.S. Pat. No. 3,747,565 by Kellam, entitled "Article of Animal Apparel"; U.S. Pat. No. 3,791,383 by Friedman, entitled "Animal shield"; U.S. Pat. No. 3,794,119 by Paiso et al, entitled "Horse shoe"; U.S. Pat. No. 4,548,026 by Shidner, entitled "Equidae coronet boot"; U.S. Pat. No. 4,633,817 by Taylor, entitled "Protective footwear for animals"; U.S. Pat. No. 4,744,333 by Taylor, entitled "Protective footwear for animals"; U.S. Pat. No. 4,931,773 by Rosen, entitled "Shoe fitting system"; U.S. Pat. No. 4,938,753 by Van Gompel et al, entitled "Seam construction in a disposable training pant, incontinence garment, or diaper"; U.S. Pat. No. 5,014,041 by Rosen, entitled "Shoe fitting system"; U.S. Pat. No. 5,076,043 by Butler, entitled "Padded elbow protector"; U.S. Pat. No. 5,137,508 by Engman, entitled "Disposable protective bandage for animals"; U.S. Pat. No. 5,209,048 by Hanson, entitled "Hoof protective device"; U.S. Pat. No. 5,211,672 by Andujar, entitled "Protective shoe"; U.S. Pat. No. 5,341,765 by McComb, entitled "Protective garment for animal front legs"; U.S. Pat. No. 5,359,963 by Jesse Jr. et al, entitled "Dog sweater"; U.S. Pat. No. 5,385,036 by Spillane et al, entitled "Warp knitted textile spacer fabric, method of producing same, and products produced therefrom"; U.S. Pat. No. 5,490,337 by Zerbinati, entitled "Article of sport footwear, in particular a ski boot"; U.S. Pat. No. 5,633,064 by Ragland et al, entitled "Heat barrier laminate"; U.S. Pat. No. 5,658,634 by Ragland et al, entitled "Heat barrier laminate"; U.S. Pat. No. 5,676,095 by Ralls, entitled "Protective paw coverings for animals"; U.S. Pat. No. 5,715,661 by Meyers, entitled "Boot for horses"; U.S. Pat. No. 5,813,144 by Prengler, entitled "Hinged entry footwear with inflatable brace"; U.S. Pat. No. 5,926,843 by Winchester, entitled "Moldable limb protector"; U.S. Pat. No. 5,937,542 by Bourdeau, entitled "Internal liner for a sport boot"; U.S. Pat. No. 5,983,526 by Pawlik et al, entitled "Impervious shoecovers"; U.S. Pat. No. 5,996,255 by Ventura, entitled "Puncture resistant insole"; U.S. Pat. No. 6,024,055 by Jesse, Sr. et al, entitled "Dog sweater with integral legs"; U.S. Pat. No. 6,089,194 by LaBelle, entitled "Reversible heat-reflective pet garment"; U.S. Pat. No. 6,226,898 by Trimble et al, entitled "Downhill ski boot with dual liner"; U.S. Pat. No. 6,240,882 by Gross, entitled "Protective garment for pets"; U.S. Pat. No. 6,319,864 by Hannigan et al, entitled "Triple layer, laminated fabric with waterproof, non-breathable inner layer"; U.S. Pat. No. 6,546,704 by Fisher, entitled "Dog boot"; U.S. Pat. No. 6,564,475 by Collins et al, entitled "Footwear with enhanced temperature control"; U.S. Pat. No. 6,564,753 by Heileg et al, entitled "Leg protecting apparatus for an animal"; U.S. Pat. No. 6,851,394 by Young, entitled "Boot and harness swimming system for an animal"; U.S. Pat. No. 6,863,033 by Fleming, entitled "Non-slip pads for animal paws"; U.S. Pat. No. 6,973,742 by Gordon, entitled "Thermal foot cover"; U.S. Pat. No. 7,174,858 by Ford, entitled "Horse boot sleeve for pastern protection"; U.S. Pat. No. 7,185,612 by Faulk, entitled "Animal wound shield"; U.S. Pat. No. 7,677,206 by Southworth, entitled "Orthopedic boot for animals"; U.S. Pat. No. 7,975,656 by Prill, entitled "Canine cleanroom suit"; U.S. Pat. No. 8,109,241 by Wrenwood Maloney et al, entitled "Dog boot"; U.S. Pat. No. 8,161,668 by Ketzenberg et al, entitled "Animal limb protective boot"; U.S. Pat. No. 8,176,880 by Hurwitz, entitled "Therapeutic pet boot"; U.S. Pat. No. 8,424,495 by Rivera-Brutto, entitled "Cover assembly for protecting a dressing on a dog's leg"; U.S. Pat. No. 8,621,765 by Geer et al, entitled "Molded insole for welted footwear"; U.S. Pat. No. 8,677,944 by Kissel, entitled "Universal footwear harness system for pets"; Des 229,197 by Jackson, entitled "Animal slipper"; Des 702,893 by Tullo, entitled "Pet shoes with harness straps"; 2003/0115777 by Hall et al, entitled "Snowboard boot with removable ankle supports"; 2005/0188925 by Yun et al, entitled "Canine footwear"; 2006/0207296 by Fujikawa, entitled "Elastic fabric and elastic face material"; 2007/0039565 by Krottinger, entitled "Dog shoes"; 2007/0044734 by Wrenwood Maloney et al, entitled "Dog boot"; 2007/0175409 by Vogelman, entitled "Disposable bootie for pets"; 2007/0175410 by Vogelman, entitled "Disposable bootie for pets"; 2008/0264351 by Williams, entitled "Disposable pet garment"; 2009/0012490 by Winqvist, entitled "Absorbent article"; 2009/0266310 by Behme, entitled "Kit for protecting dog leg"; 2010/0211034 by Fish et al, entitled "Odor absorbing extrudates"; 2010/0247846 by Erickson, entitled "Breathable fabric lamination"; 2011/0041780 by Hurwitz, entitled "Therapeutic gel pad"; 2011/0277702 by Taslakian, entitled "Disposable slippers for animals"; 2012/0010584 by Schmidt, entitled "Absorption body for use on wounds"; 2014/0150299 by Entler, entitled "Canine protective boot"; 2014/0174379 by Kissel, Jr., entitled "Harness system for pets with mobility handicap"; 2014/0318478 by Cruz, entitled "Protective animal garment"; and KR 200371823 by Lee, entitled "Pet-dog shoes with tongues".

In addition to the foregoing, the present inventors have also illustrated a variety of protective dog boots, the teachings and contents of each which are incorporated herein by reference, including U.S. Pat. No. 7,971,557, entitled "Dog boot"; U.S. Pat. No. 8,113,152, entitled "Canine wound boot"; U.S. Pat. No. 9,485,962, entitled "Dog boot"; U.S. Pat. No. 9,497,932, entitled "Canine wound boot"; U.S. Pat. No. 9,629,336, entitled "Dog boot"; U.S. Pat. No. 9,943,065, entitled "Dog boot"; U.S. Pat. No. 10,238,089, entitled "Dog Boot with Liner having Integral Protruding Cushioning Pad"; and PCT application WO 2009/120723, entitled "Kevlar dog boots".

In addition to the foregoing patents, Webster's New Universal Unabridged Dictionary, Second Edition copyright 1983, is incorporated herein by reference in entirety for the definitions of words and terms used herein.

As may be apparent, in spite of the enormous advancements and substantial research and development that has been conducted, there still remains a need for a more adaptable, better fitting, and reasonably priced dog boot.

SUMMARY OF THE INVENTION

In a first manifestation, the invention is a canine trail boot. The canine trail boot has a boot top, and a sole coupled to the boot top to define a paw receiving space there between. The sole has five pad cups including four digital pad cups and a fifth metatarsal metacarpal pad cup. Each of the five pad cups has a cup base exterior surface that is configured to be in ground contact and an interior surface that is configured to be in contact with a dog's pad. A cup sidewall rises vertically from the cup base and is configured to be substantially out of contact with a flat ground surface and is spaced in a portion adjacent to the ground surface by a void from a vertically rising side wall of an adjacent one of the five pad cups. A flexible lug couples the cup sidewall to the adjacent one of the five pad cups in a portion of the cup side wall distal to the cup base.

In a second manifestation, the invention is an animal boot. A boot top is coupled to a sole to define a paw receiving space there between. The sole has a flexible lug coupling at least two pad cups. Each of the at least two pad cups has a cup base exterior surface that is configured to be in ground contact and an interior surface that is configured to be in contact with a dog's pad. A cup sidewall rises vertically from the cup base and is configured to be substantially out of contact with a flat ground surface and spaced from a vertically rising side wall of an adjacent one of the at least two pad cups. A coupling is provided between the cup sidewall and flexible lug distal to the cup base. The flexible lug configured to be sufficiently pliable to permit each pad cup to move both up and down and side to side through at least a functional range effective to mimic independent pad motion in a dog that is relatively uninhibited by adjacent pad cups.

In a third manifestation, the invention is a unitary canine boot sole. A mid-base has an exterior configured for ground contact during locomotion, a leading portion that leads a trailing portion and which is distal on the mid-base relative to the trailing portion. A toe rises from the leading portion of the mid-base and has a plurality of unidirectional treads. A tail rises from the trailing portion of the mid-base. In some further manifestations, the tail may further comprise an omnidirectional tread, may further comprise a pair of generally linear treads spaced from each other and configured to engage with a ground surface, and may further be configured to receive and retain a tensioned strap there between. In other further manifestations, the toe unidirectional treads may comprise a right triangular prism geometry.

In a fourth manifestation, the invention is a dog boot suitable for insertion and removal of a dog paw and providing an operatively protective covering about the dog paw. A generally tubular body member has a toe end and an open end. A means adjacent the open end is provided for contracting the open end from an open dog paw receiving position to a contracted dog paw retaining position. At least one adjustable metatarsal and metacarpal cushioning pad is selectively affixed on an interior of the generally tubular body member and extends intermediate between the open end and toe end. The at least one adjustable metatarsal and metacarpal cushioning pad is selectively adjustable between a first position and a second position when not selectively affixed on the interior of the generally tubular body member, the first position closer to the toe end than the second position. The at least one adjustable metatarsal and metacarpal cushioning pad is configured to engage with a one of a dog paw metatarsal pad and a dog paw metacarpal pad when selectively affixed on the interior of the generally tubular body member.

OBJECTS OF THE INVENTION

Exemplary embodiments of the present invention solve inadequacies of the prior art by providing a molded sole having raised lugs on the pad that conform to the pad shape of a dog's foot. These lugs divide the sole into individual sections that receive a single pad from the dog foot, with each section allowing some individual or independent movement that better replicates a dog's paw movement. The sole exterior may optionally incorporate means for attaching studs or other custom exterior features. The sole interior may be layered with one or more insoles that provide the selection of puncture resistance, heat isolation or reflection, and other custom interior features. The boot upper is preferably provided with a strategically located protruding cushioning pad similar to that illustrated in our U.S. Pat. Nos. 7,971,557; 8,113,152; 9,485,962; 9,497,932; 9,629,336; 9,943,065; 10,238,089; and PCT application WO 2009/120723 incorporated herein above. In some embodiments, the strategically located cushioning pads are adjustable relative to the opposed closed and open ends of the boot, and so may be positioned for perfect placement for a particular dog relative to the metatarsal or metacarpal pad.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a dog boot which is readily placed about a dog's paw. A second object of the invention is securement of the boot against slippage, spin, or separation with respect to the dog's leg, while simultaneously substantially reducing the risk of circulatory disruption or harm to the dog. Another object of the present invention is to ensure that the boot will readily accommodate a wide range of proportions of paw size to leg diameter. A further object of the invention is to provide a boot which is substantially non-slip with respect to a surface the dog is traversing, and which will preferably differentially grab the surface with more grip in the direction the dog is trying to apply force to than opposite thereto. An additional object of the invention is the provision of protection from temperature extremes and environment which might otherwise injure a dog's paw. Yet another object of the invention is to provide a more readily produced boot which is not unnecessarily complex or expensive to produce, and yet which is durable. An even further object of the invention is that the boot float for water usage. Another object of the invention is that the boot not unduly abrade the dog during use. An additional object of the invention is the provision of independent movement of individual pads within the dog's paw, providing a dog improved feel and comfort.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 18 illustrates the alternative embodiment molded sole of FIG. 14 from a rear elevational view;

FIG. 19 illustrates the alternative embodiment molded sole of FIG. 14 from a bottom plan view showing the exterior surface of the sole;

FIGS. 35 and 36 illustrate the preferred embodiment combination molded liner of FIG. 26 and alternative embodiment molded sole of FIG. 20 in further combination with an alternative embodiment upper, from a front and top projected view and a bottom and rear projected view;

DESCRIPTION OF THE PREFERRED EMBODIMENT

Manifested in the preferred and alternative embodiments, the present invention provides a molded sole 100 such as illustrated in FIGS. 1-6. Preferred embodiment molded sole 100 comprises a toe 110, a mid-base 120, and a tail 150 that all optionally but preferably may be formed or molded simultaneously. While preferred embodiment molded sole 100 is quite complex and has many features integrated therein, as will become apparent herein below, this complexity may be incorporated into a single mold that can be used to form many molded soles. This enables the manufacture of a boot having preferred embodiment molded sole 100 using common manufacturing techniques, thereby keeping the fabrication cost of each individual boot reasonably low. Nevertheless, other fabrication techniques may also be used in alternative embodiments, and so the present invention is not solely limited to the technique of molding.

Figure 3:
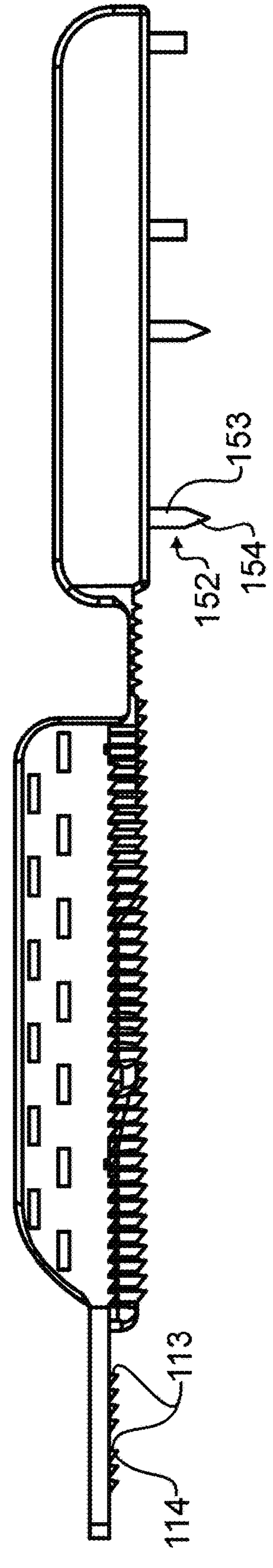
FIG. 3 illustrates the preferred embodiment molded sole of FIG. 1 from a side elevational view.
Figure 4:
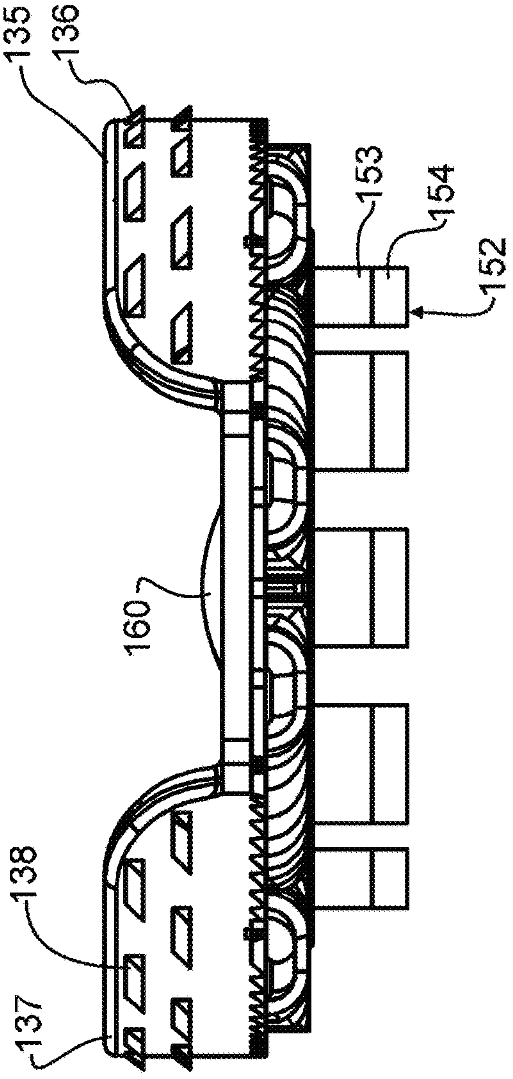
FIG. 4 illustrates the preferred embodiment molded sole of FIG. 1 from a front elevational view.

While not essential, in preferred embodiment molded sole 100 a toe 110 is preferably provided which is configured to roll over the tip of a boot to protect against dragging type abrasion on the tip of the boot. Toe 110 has a generally planar portion 111, and a plurality of treads 112. At least one, and preferably each of the plurality of treads 112 has a geometry of a right triangular prism. As best illustrated in FIG. 3, the geometry of treads 112 is such that the face 113 of the right triangle prism perpendicular to the generally planar portion 111 faces to the rear or toward tail 150. Consequently, when a dog is trying to pull or accelerate, this perpendicular face 113 is most aggressively grabbing into the ground or underlying surface to gain the best traction. When a dog is pulling or accelerating, they tend to shift forward on their paws, which would naturally cause their nails to dig into the ground surface. Since the dog's nails are preferably isolated from the ground by preferred embodiment molded sole 100, these treads 112 are designed to perform this function. However, when a dog is slowing down, or trying to stop, they will shift back on their paws toward the metacarpal and metatarsal pads, removing toe 110 from any contact with the underlying ground surface. Consequently, when not trying to pull or accelerate, any contact between the ground surface and toe 110 will in most instances be accidental, unintentional, or due to some problem or hindrance with the dog that will preferably not slow or stop the dog. By providing a face 114 in the right triangle prism geometry of treads 112 that is intermediate between parallel and perpendicular to generally planar portion 111, there will be less engagement with the ground and a greater tendency for toe 110 to skip, thus providing toe 110 with a coefficient of friction or force of engagement that will generally be much greater when pulling than when dragging. As may be apparent then, this right triangle prism geometry of treads 112 will preferably differentially grab the ground or surface with more grip in the direction the dog is trying to apply force to than opposite thereto.

Preferred embodiment molded sole 100 also comprises a mid-base 120 having a generally planar portion 121. Generally planar portion 121 of mid-base 120 is co-planar with generally planar portion 111 of toe 110, though there is no strict requirement that this be the case. A dog's foot has five pads, including four finger-type digital pads and the metacarpal or metatarsal pad, which is the large heart shaped cushioning pad at the rear. Extending in a generally downward manner below generally planar portion 121 are a plurality of digital pad cups 122, 123, 124, 125 and a metatarsal or metacarpal pad cup 126 that are each configured to receive and conform to the dog's digital pads and either metatarsal or metacarpal pad, respectively. These pad cups 122-126 are particularly visible in FIG. 5. In addition, each of the digital pad cups 122, 123, 124, 125 may also be configured to have a primarily round or tear drop shape when viewed from the top or bottom plan views of FIGS. 2 and 1, respectively, and to have an extended portion within which a dog's nails may also be received. As may be apparent, preferred embodiment molded sole 100 will not fit all sizes of dog paws, and so will need to be dimensioned to a single size or limited range of sizes.

In accord with the present invention, it is desirable that the dog feels the ground through the trail boot to accept wearing dog boots. The more comfortable the dog feels while wearing boots, the less likely he is to chew on them or refuse to let the handler put the boot on the paw. Between each of the dog's digital and metatarsal or metacarpal pads, there is a natural separation that allows individual pads to shift up and down and side to side relative to an adjacent pad. However, prior art boots having a thicker or stiffer sole are so rigid that the sole inhibits this independent motion sufficiently that the dog loses important sensory input that is otherwise provided by the independent movement of pads.

Figure 2:
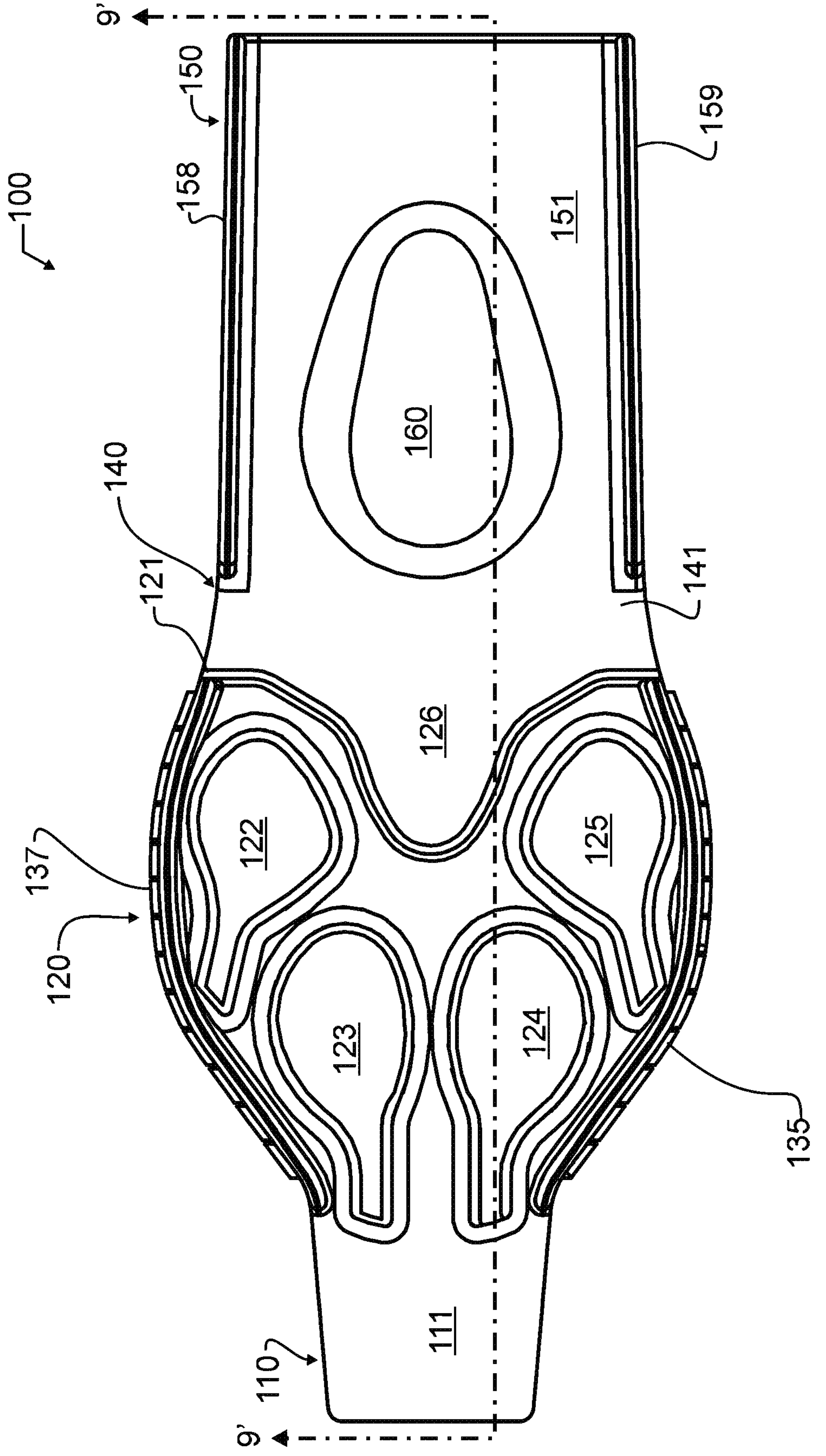
FIG. 2 illustrates the preferred embodiment molded sole of FIG. 1 from a top plan view.
Figure 5:
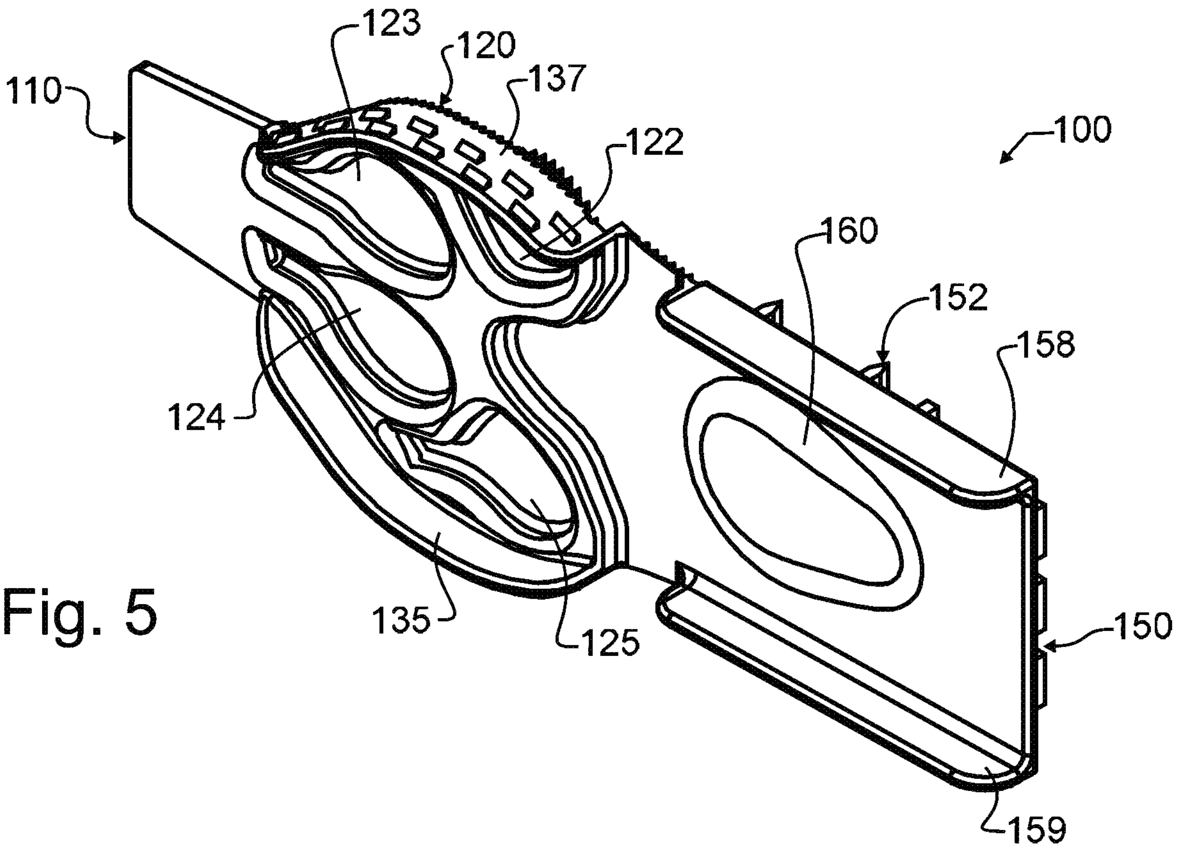
FIG. 5 illustrates the preferred embodiment molded sole of FIG. 1 from a top projected view.

To enable a dog to better feel the ground, in a manner much more closely resembling the natural sensory input, the present invention uses these natural pad separations in the design of preferred embodiment molded sole 100. The generally planar portion 121 of mid-base 120 serves as a plurality of raised lugs that separate each of the pad cups 122-126. The planar portion 121 is preferably fitted into a dog's natural pad separations, and helps to precisely position each of the dog's pads within the appropriate cup. Each pad is received by an associated pad cup, and separated from an adjacent pad cup at the top by a portion of generally planar portion 121 on the interior of the molded base. Consequently, the interior pattern of mid-base 120 visible best in FIGS. 2 and 5 is designed to generally mirror the geometry of a dog's natural paw pad.

For each pad cup 122-126 to function as intended, each pad cup will to at least limited extent move up and down and side to side through at least a functional range relatively uninhibited by adjacent pad cups. In the preferred embodiment, this is achieved with the cup-shaped geometry of each of pad cups 122-126, having a cup base that is configured to be in ground contact on an exterior surface and to be in contact with a dog's pad on an interior surface. The cup sidewalls rise vertically from the cup base, out of contact with a flat ground surface and spaced from the side walls of an adjacent cup. Distal to the cup base the side walls connect to generally planar portion 121. This means that the only connection between adjacent pad cups 122-126 is generally planar portion 121. As long as generally planar portion 121 is sufficiently pliable, each pad cup will then move up and down and side to side through at least a functional range relatively uninhibited by adjacent pad cups.

Figure 1:
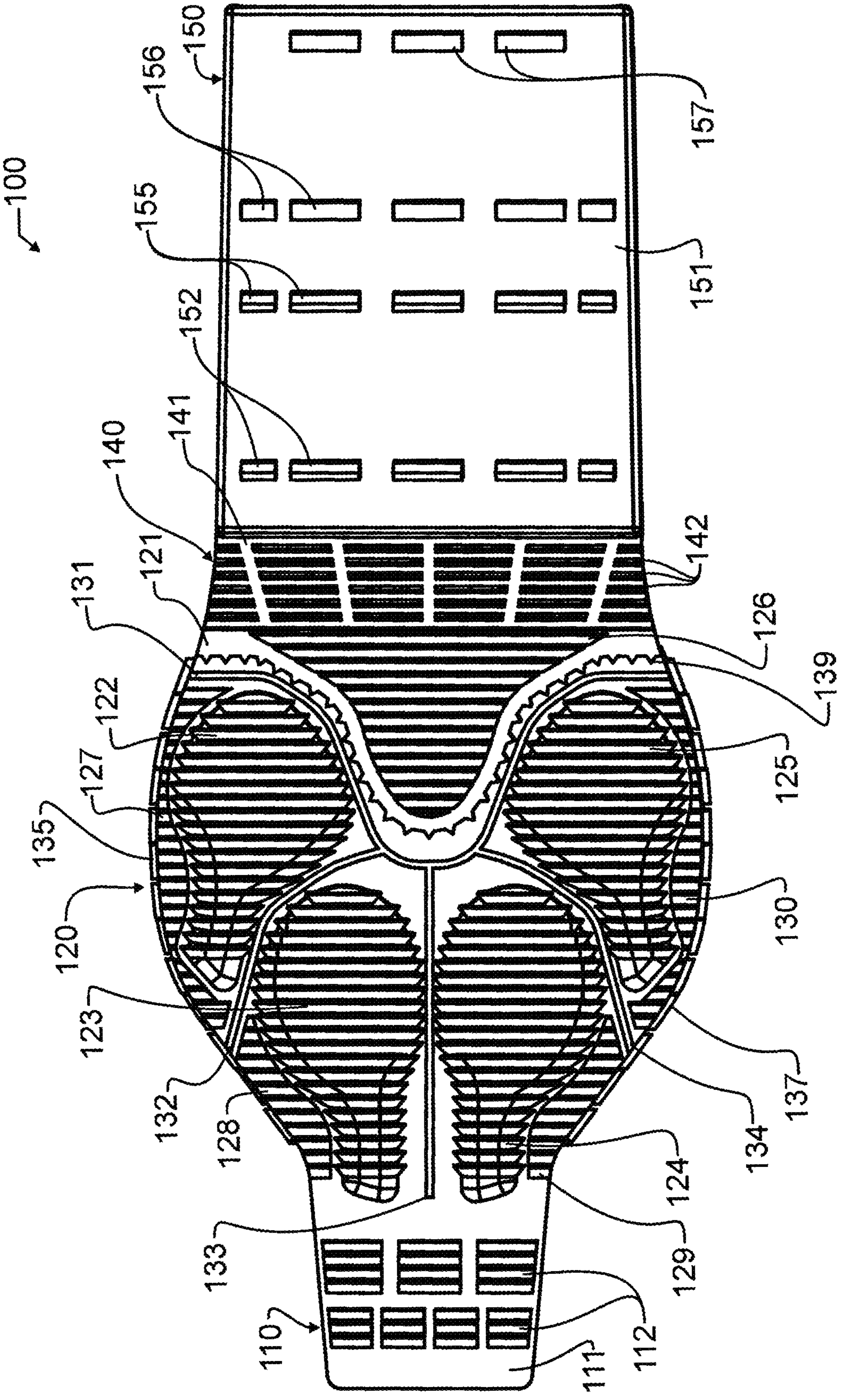
FIG. 1 illustrates a preferred embodiment molded sole designed in accord with the teachings of the present invention from a bottom plan projected view showing the exterior surface of the sole.
Figure 6:
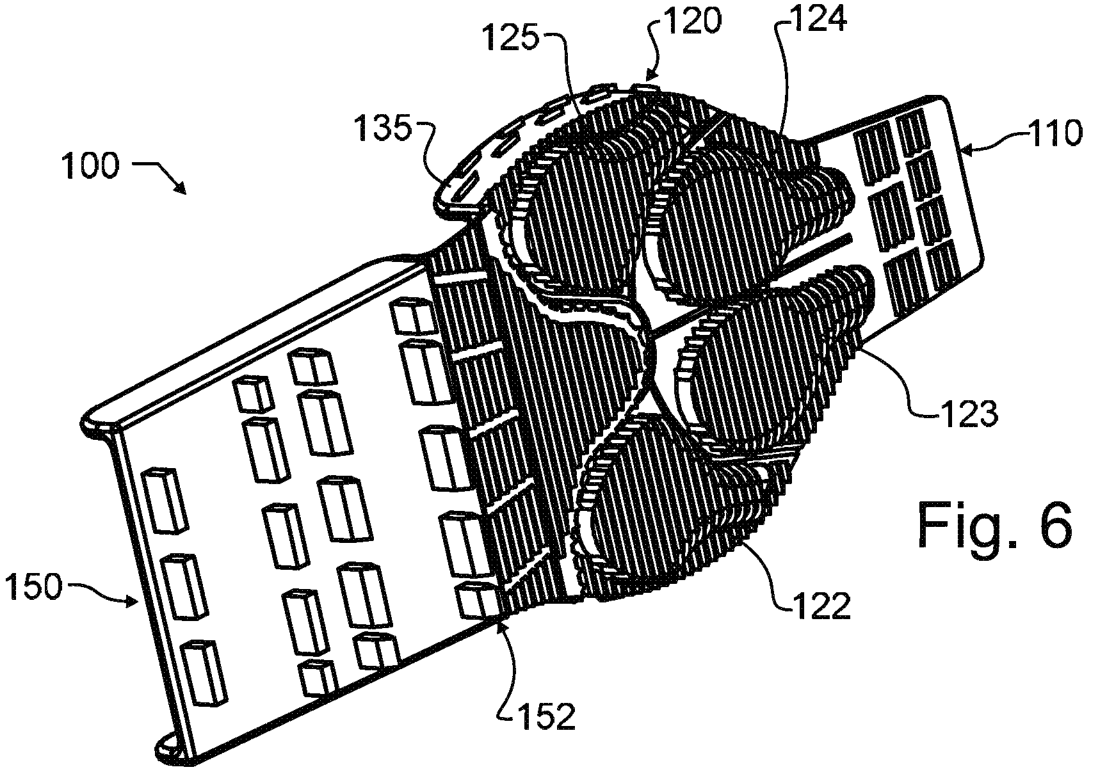
FIG. 6 illustrates the preferred embodiment molded sole of FIG. 1 from a bottom projected view.

While the generally flat sheet geometry of generally planar portion 121 can be sufficient to permit significant flexure between adjacent ones of pad cups 122-126, in preferred embodiment molded sole 100 optional flexure grooves 131, 132, 133, 134 have been provided between adjacent pad cups 122-126. These flexure grooves 131-134 are thinner than generally planar portion 121 and so provide even more flexure and independent movement of individual pad cups 122-126, and consequently improve both feel and comfort for the dog. While they are illustrated in FIGS. 1 and 6 as a single groove, it will also be understood that two or more adjacent grooves may also be provided as desired. Two flexure grooves 131 are, for exemplary purposes, illustrated in FIG. 9.

Flexure in generally planar portion 121, the flexure which may be emphasized or increased by flexure grooves 131-134 or the equivalent, permits each one of pad cups 122-126 to raise or lower to a degree sufficient to be functionally perceived and interpreted by a dog as being relatively independent of adjacent pad cups. Just as each of the dog's pads are ultimately coupled to adjacent pads through connecting flesh, and so cannot travel in an unlimited independent manner, each of pad cups 122-126 are also ultimately coupled to adjacent pad cups through generally planar portion 121. However, with proper design in light of the present disclosure, generally planar portion 121 may be configured to provide little more restriction on the movement of individual pads than a dog's own connecting flesh.

As noted, in preferred embodiment molded sole 100 this relative movement is accomplished by providing open space at and rising from ground level between adjacent cup side walls, and a relatively flexible lug created by generally planar portion 121 at the top of adjacent cup side walls. The flexible lug then acts as a natural hinge that may not only flex, but may also roll to some extent, thereby allowing both side to side and also upward and downward relative motion between adjacent pad cups.

Unfortunately, any time a flexible material that defines vertically rising side walls that are connected at a top is used to traverse an irregular and inconsistent surface such as gravel, there is also a likelihood that eventually a piece of the gravel which is of just the right dimension will be pressed between adjacent side walls and will tend to stick or become wedged there between. While this may happen with preferred embodiment molded sole 100, several features work in combination to prevent this from being detrimental to the dog. First, and as visible in FIGS. 1 and 6, the cup side walls are preferably quite vertical. This helps to limit the size of material that can wedge in the first place to a relatively small range. In the event matter does wedge in, and regardless of how vertical the cup side walls are, the inherent hinging nature of the lugs defined by generally planar portion 121 and flexure grooves 131-134 will act, as the dog traverses a surface, to cause adjacent pads to shift closer to and farther from each other. When one pad shifts farther from an adjacent pad, the space between increases, allowing any wedged matter to drop out and no longer present a problem. Consequently, any matter that may wedge between pad cups will be quite transient, and the cup side walls will help to protect the dog paw from harm by this transient matter.

In an alternative embodiment, the open space between cup side walls present in mid-base 120 may be filled with a relatively more resilient material than that used for the fabrication of the rest of mid-base 120. Such material thereby fills the void and acts to prevent matter from wedging into the open spaces in the first place. By being more resilient, this fill material is configured to have relatively less effect on flexure than that of generally planar portion 121. However, the formation of a second material adds an additional molding operation. In addition, the lower density material will in many cases also be less durable, and so may tend to wear, eventually capturing matter rather than preventing the matter from collecting. Consequently, a particularly durable lower density material may be desired for some embodiments.

In yet another alternative embodiment, a resilient rubber or elastomeric membrane may cover the spaces to block access of matter to the voids. Nevertheless, the resilient rubber membrane may suffer from the same limitation as a lower density material, initially closing the void, but through wear and tear opening up and retaining matter therein. Again, a particularly durable resilient membrane may be desired for some embodiments.

As will be understood, wet slippery conditions tend to be a problem without some type of raised surface on the base of the boot. When the dog accelerates from a walk to a run, braking and pivoting require traction to prevent injury to the dog. Prior art boots provide good traction indoors with a tacky but smooth surface. Unfortunately, this type of surface is less effective outdoors. Consequently, some conditions require a raised lug of some type on the bottom to provide traction in loose gravel, rock, or on icy or wet terrain. Preferred embodiment molded sole 100 may preferably provide a textured exterior surface to each of the pad cups 122-126 such as a plurality of treads as illustrated for example in FIG. 1. These treads allow relatively greater flexure about an axis transverse to preferred embodiment molded sole 100, giving the sole more flexure in this direction to provide a more comfortable roll as the dog walks or runs. While not essential, these treads are preferably configured to have a geometry resembling a right triangle prism, similar to and with the similar benefits to those of treads 112 already discussed herein above. The particular texturing is not critical to the proper function of the invention, and other patterns or geometries besides the right triangle prism and such as are known in the art of both pet and human foot coverings will be considered to be incorporated herein. In one alternative embodiment, the sole exterior may incorporate means for attaching studs or other custom exterior features.

In addition to the treads provided on each of the pad cups 122-126, optional treads 127, 128, 129, 130 may also be provided in areas adjacent to each of the pad cups 122-126. These treads 127-130 are deemed as optional because, as best illustrated in FIG. 6, these treads must either be substantially taller than the treads of pad cups 122-126 or they will only contact a ground surface when the surface is particularly soft or conformal, such as would be the case with unpacked snow, mud, or soft sand.

Sidewalls 135, 137 provide secure containment and proper positioning of the dog's paw, and also provide a convenient attachment point for a boot upper. Optional sidewall treads 136, 138 provide some limited additional traction particularly when a dog is turning a corner, and may provide additional limited benefit in soft or conformal ground surfaces such as the aforementioned unpacked snow, mud, or soft sand, and may also provide a conformal protective bumper that helps to soften impact with vertical surfaces such as rock edges, trees, and other objects which the side of the dog's paw might otherwise impact. The relative sparsity of these sidewall treads 136, 138 ensures that such impact will be relatively cushioned, and yet the staggered rows of right triangle prism treads will provide good engagement with the aforementioned soft ground surfaces to help reduce the rate at which the dog paw will sink, while interfering less with rate of withdrawal.

As noted herein above, when a dog is trying to stop quickly, it will shift the paws rearward, applying less force to the nails and more to the metatarsal and metacarpal pads. To facilitate stopping, and using this shift advantageously, an optional metatarsal or metacarpal pad vertical side wall tread 139 such as is visible in FIG. 1 is also provided. This metatarsal or metacarpal pad vertical side wall tread 139 will preferably better engage with a surface when the dog is trying to stop than a smooth or untreaded surface would. Serrations are provided thereon to improve such stopping.

To further improve the dog's ability to stop or brake, and to also improve the ability for a dog to run or pull in full stride, a metatarsal or metacarpal pad rear wall 140 is provided that has a metatarsal or metacarpal pad rear wall generally planar portion 141 and a plurality of metatarsal or metacarpal pad rear wall treads 142. Since these rear wall treads 142 may be bi-directionally functional, they are not directionally oriented in the manner that treads 112 are. Instead, in preferred embodiment molded sole 100 these rear wall treads 142 are symmetrical about a vertical transverse plane.

Affixed with and extending from mid-base 120 distally from and in a directional generally opposed to toe 110 is tail 150. Tail 150 has a generally planar portion 151 that in preferred embodiment molded sole 100 is generally co-planar with generally planar portion 141. Extending downward therefrom, and particularly visible in FIGS. 1, 3, 4, and 6, are a plurality of treads 152, 155 that may be relatively larger than treads 112, 142. Treads 152 define a first generally transverse row of protrusions extending out from generally planar portion 151. At least one, and preferably all of treads 152 have a geometry that includes a generally rectangular parallelepiped base 153 and further has a chiseled point 154 distal to generally planar portion 151. Treads 155 define a second generally transverse row of protrusions also extending out from generally planar portion 151. Treads 155 may optionally but preferably have a geometry like that of treads 152. These two parallel rows of large treads 152, 155 perform several diverse functions. These two parallel rows define a strip or valley between them into which a strap such as strap 40 illustrated in FIG. 7 may be wrapped. Consequently, the strap will be prevented from either sliding toward or away from mid-base 120. In addition, and as noted herein above, when a dog is either trying to stop or striding, they may occasionally put more of their paw, farther up the leg, in contact with the ground. For example, when stopping or descending a slope, the dog may engage the carpal pad. In such postural position, treads 152, 155 will engage with the ground, further improving the dog's traction. Two more rows of treads 156, 157 may also be provided. These treads 156, 157 may engage the ground, but this is unlikely and so these may instead optionally but preferably have a generally rectangular parallelepiped geometry. Tail sidewalls 158, 159 in a manner similar to sidewalls 135, 137 help to locate the dog's upper paw and provide a good coupler to a boot upper.

Most preferably within tail 150 there is a raised cushioning pad 160. This raised cushioning pad 160 functions in a manner similar to that of the rear foam cushioning pad described in our U.S. Pat. Nos. 7,971,557; 8,113,152; 9,485,962; 9,497,932; and 9,629,336 incorporated by reference herein above, and in one alternative embodiment, may be implemented as described therein. However, in preferred embodiment molded sole 100, raised cushioning pad 160 may be formed unitarily within tail 150. This simplifies fabrication and enables a relatively precise and predictable geometry to be formed.

The material used to fabricate a molded sole in accord with the teachings of the present invention is not critical, but may for exemplary purposes comprise a semi-rigid rubber or foamed rubber, including but not limited to neoprene. Further, the density, rigidity, durometer, coefficient of friction, and toughness of the molded sole may be varied by composition and density of the sole material to meet particular applications. Factors which will need to be considered include, but are not limited to, the comfort of the boot, the coefficient of friction, and the durability, the first two which are generally in opposition of the durability. Nevertheless, the provision of flexure grooves 131, 132, 133, 134 as noted herein above allows the use of more durable material, while still obtaining a desired flexibility and comfort for a dog. Another factor that may enter into the selection of the material is density. When the density of a boot fabricated from preferred embodiment molded sole 100 is less than that of water, the boot will float, improving utility for some applications.

Figure 7:
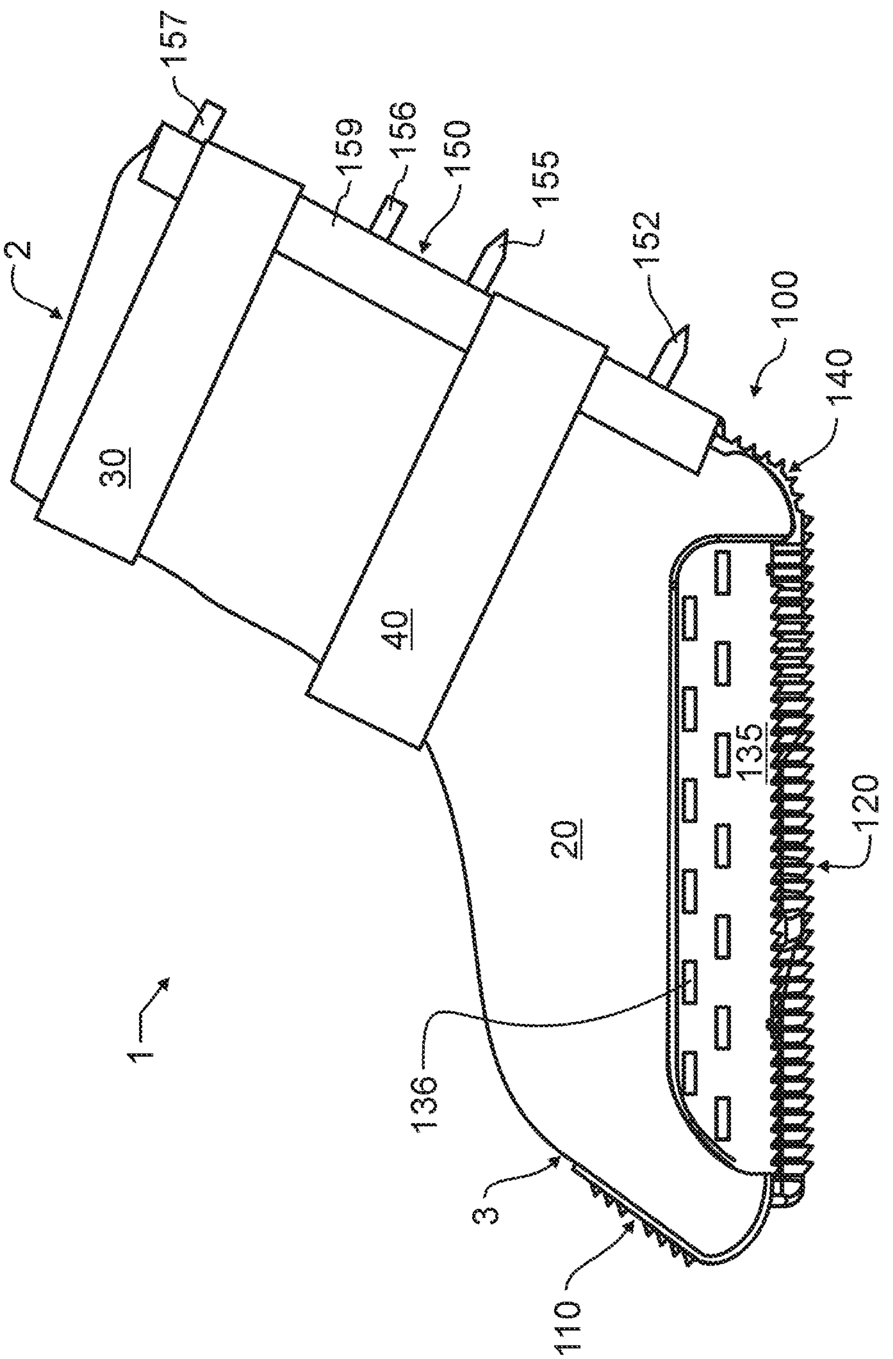
FIG. 7 illustrates a preferred embodiment trail boot incorporating the preferred embodiment molded sole of FIG. 1.
Figure 8:
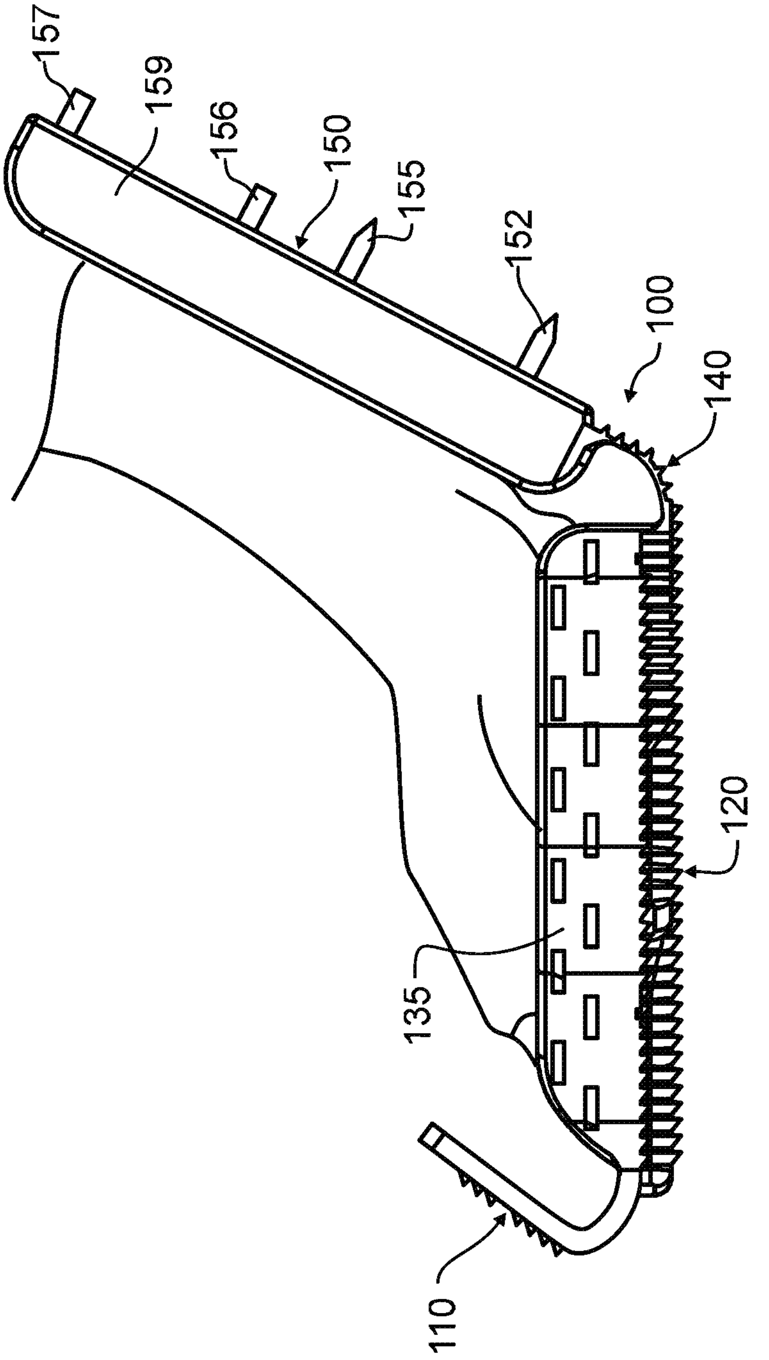
FIG. 8 illustrates the preferred embodiment trail boot of FIG. 7 but with the upper and straps removed to reveal the preferred embodiment molded sole of FIG. 1 in further combination with a dog paw.
Figure 9:
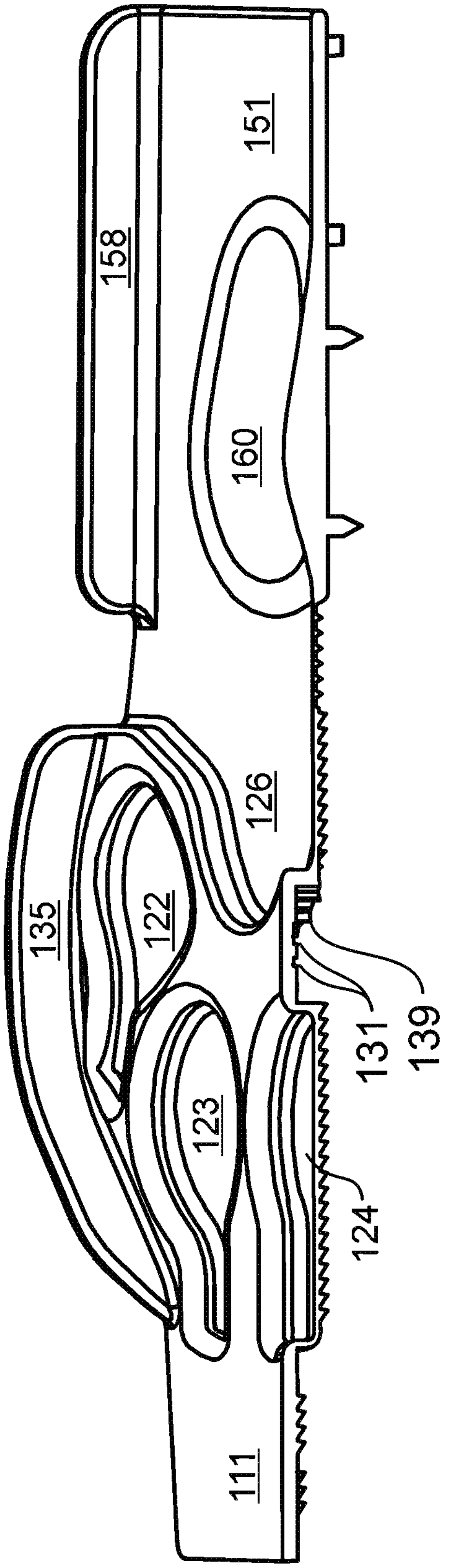
FIG. 9 illustrates the preferred embodiment molded sole of FIG. 1 from a projected and vertical plane sectional view taken along section line 9' in FIG. 2.
Figure 10:
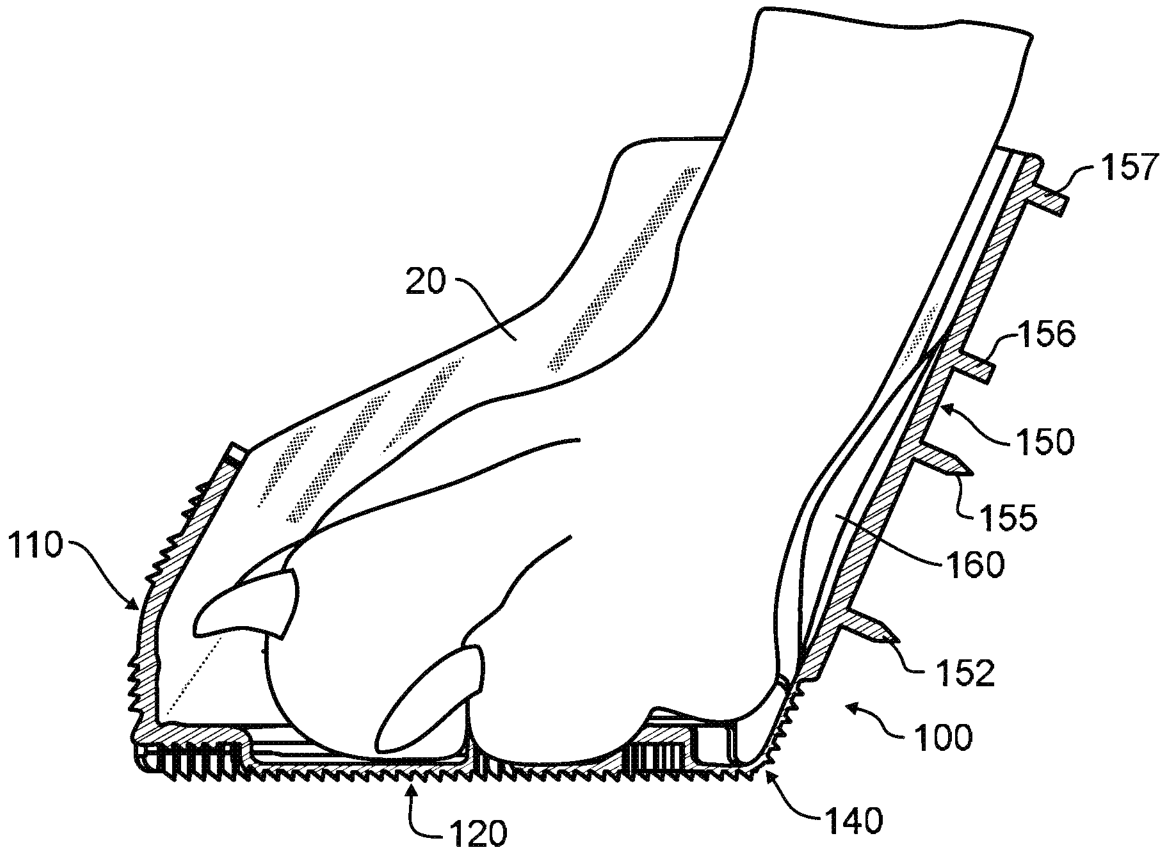
FIG. 10 illustrates the preferred embodiment molded sole of FIG. 9 and in the position of and in further combination with the dog paw as illustrated in FIG. 8, and with a boot upper affixed to the molded sole.

FIG. 7 illustrates a preferred embodiment trail boot 1 incorporating preferred embodiment molded sole 100, while FIGS. 8-10 open up preferred embodiment trail boot 1 for illustrative purposes by not illustrating a boot top 20 and straps 30, 40 in FIG. 8. FIG. 9 illustrates just molded sole 100 as manufactured in flat form from sectional view, while FIG. 10 illustrates this sectional view of molded sole 100 shaped and coupled to boot top 20 and with a dog paw therein.

Turning first to FIG. 7, boot 1 has the appearance of a flexible or somewhat flaccid tube, with a closed end 3 defined by toe 110 and an open end 2 distal therefrom. As may be apparent, this simple and generally tubular construction in combination with straps 30, 40 ensures that preferred embodiment trail boot 1 may be readily, quickly, and intuitively placed about a dog's paw.

Boot 1 includes preferred embodiment molded sole 100 having a non-slip ground-engaging mid-base 120. The bottom of preferred embodiment boot 1 is covered from closed end 3 up to straps 30, 40 with preferred embodiment molded sole 100. This continuity ensures that the significant forces applied to a boot by a dog are securely coupled between the dog paw and molded sole 100 at several locations, including each of the pad cups 122-126 and adjacent generally planar portion 121, as well as into tail 150 and the associated straps 30, 40, and raised cushioning pad 160. With a structurally sound molded sole 100, this ensures that preferred embodiment trail boot 1 is secured against slippage, spin, or separation with respect to the dog's leg, while the thereby precisely located raised cushioning pad 160 simultaneously substantially reduces the risk of circulatory disruption or harm to the dog. This safe and secure coupling between preferred embodiment trail boot 1 and a dog's leg not only keeps the boot on, but also helps to ensure that the boot does not unduly abrade the dog during use.

Flexibility of preferred embodiment trail boot 1 is an extremely important feature to provide comfort and a natural feel for the canine. Preferred embodiment molded sole 100 will allow for enhanced traction in "trail" situations and provide greater durability for many canines when recreating or working in rough abrasive terrain. This preferred embodiment trail boot 1 is designed to feel very natural to the dog and allow dogs to wear the boots for longer periods of time.

Boot top 20 preferably comprises a relatively soft, compliant, durable, and strong material that is resistant to the elements. Standard nylon, ballistic nylon, or Cordura is most preferred, owing to the relatively low cost, inherent durability, ready fabrication, and permeability to gasses, while still providing some water resistance. With somewhat larger exposed surface area, the breathable nature of a woven or non-woven fabric will be very beneficial in many applications. In alternative embodiments, boot 1 may incorporate a breathable mesh panel for summer, and a waterproof design for winter.

The fabric used in the construction of boot top 20 will most preferably be relatively resilient or stretchy. The ability to stretch, or the provision of fabric pleats or other known equivalents thereof, is essential to allow the back portion of boot 1 to move with the dog. Typically when the dog is standing upright, the boot will be in a generally upright position such as illustrated in FIGS. 8 and 10 with the tail 150 forming an obtuse angle approaching perpendicular to mid-base 120. However, when the dog is moving about, the boot will very preferably extend from the tail 150 being much closer to parallel to mid-base 120 to possibly forming an acute angle with mid-base 120. To accommodate this wide angular change between tail 150 and mid-base 120, the fabric must stretch, or be otherwise provided for, which in turn will allow the elastomeric molded sole 100 to stretch at the apex of the base and back of the boot.

Boot top 20 will preferably be coupled to toe 110, sidewalls 135, 137 metatarsal or metacarpal pad rear wall 140, and tail sidewalls 158, 159 using a suitable fastener. For exemplary and non-limiting purpose, in various embodiments techniques such as an adhesive, stitching, and other suitable fastening techniques will be used.

As shown in the preferred embodiment boot 1, toe 110 provides protection when a dog, for whatever reason, drags the toe. Toe 110 will help prevent serious damage to boot 1 as well as to the dog's foot, and so is preferably a strong, abrasion resistant material. In some instances, such as in the case of a dog with neuropathy or other disorder, the dog may tend to drag their paw. In such instances, a hard or substantially more durable overlay may be provided in addition to or as an integral expansion to toe 110, to protect boot top 20 and the dog's paw from harm.

Strap 30, which is relatively close to the open end 2 of boot 1, would potentially slip above open end 2, and so become less effective. To prevent such slippage from occurring, treads 156, 157 are provided at the top back of boot 1, adjacent open end 2. These treads limit strap 30 from either sliding up or down. The similar treads 152, 155 likewise limit strap 40 from either sliding up or down. While not separately illustrated, but if so desired, features may be provided to permanently secure straps 30, 40 to tail 150 or to boot top 20.

Treads 112, 142, 152, 155, and 156 are each segments of a broken transverse line of treads. These segments are used instead of a continuous transverse tread to permit greater flexibility, so that for exemplary purposes tail 150 may wrap or curve about a dog's paw and leg into a more generally tubular configuration. If these treads 112, 142, 152, 155, and 156 were unbroken, the treads would undesirably stiffen preferred embodiment molded sole 100.

Raised cushioning pad 160 will most preferably extend on an inside of tail 150, within a circumference of contraction created by strap 40 when strap 40 is tightened about the leg of a dog. In practice, raised cushioning pad 160 prevents undesirable constriction of a dog's leg, while at the same time forming a relatively high friction contact with the dog's leg, to help to ensure that boot 1 does not slip off. Noteworthy here is the fact that Cordura and ordinary nylons are generally relatively slippery, though these same materials are very durable and desirable for their intrinsic durability. Consequently, to use a durable and flexible nylon without the present synergy of raised cushioning pad 160 will result in the boots sliding from the dog's legs. Raised cushioning pad 160 will also ensure a relatively complete surface contact with an otherwise non-cylindrical leg, which also helps to ensure even force distribution about the entire circumference of contraction formed by strap 40.

Most preferably, preferred embodiment trail boot 1 will be dimensioned to cooperate with the intrinsic geometry of a dog paw. In this regard, it is noted that most dog paws are slightly wider at the pad than they are in the leg region slightly above and immediately adjacent the pad. Consequently, with reasonable sizing and placement, raised cushioning pad 160 will be placed on the leg adjacent the dog's metatarsal or metacarpal pad, and strap 40 will secure raised cushioning pad 160 in that position. Such placement ensures that the bulge at the dog's metatarsal or metacarpal pad will produce interference with raised cushioning pad 160, thereby preventing raised cushioning pad 160 from sliding down into the dog's pad region. As may be apparent, preferred embodiment trail boot 1 will readily accommodate a wide range of proportions of paw size to leg diameter.

In accord with the present teachings, several further alternative embodiment boots are additionally contemplated herein, including in one embodiment the provision of smaller sized boots for rear paws, and in a further embodiment providing color coding or other indicia to the differently sized front and rear boots to easily tell which boots are for front paws and which are for back paws.

Figure 11:
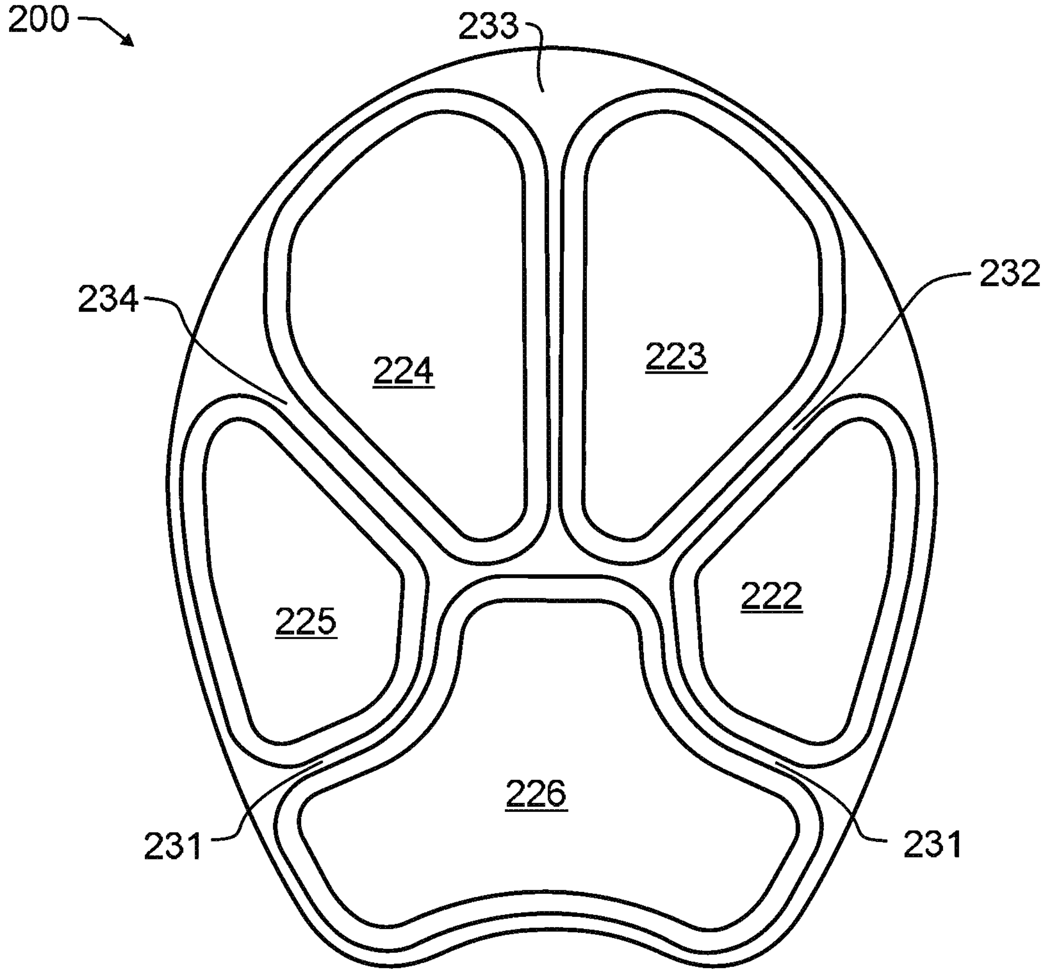
FIG. 11 illustrates a preferred embodiment pad that may preferably be used in conjunction with the preferred embodiment molded sole of FIG. 1 from a bottom view.
Figure 12:
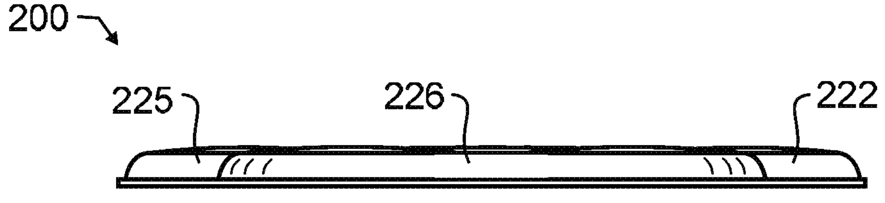
FIG. 12 illustrates the preferred embodiment pad of FIG. 11 from a rear view.
Figure 13:
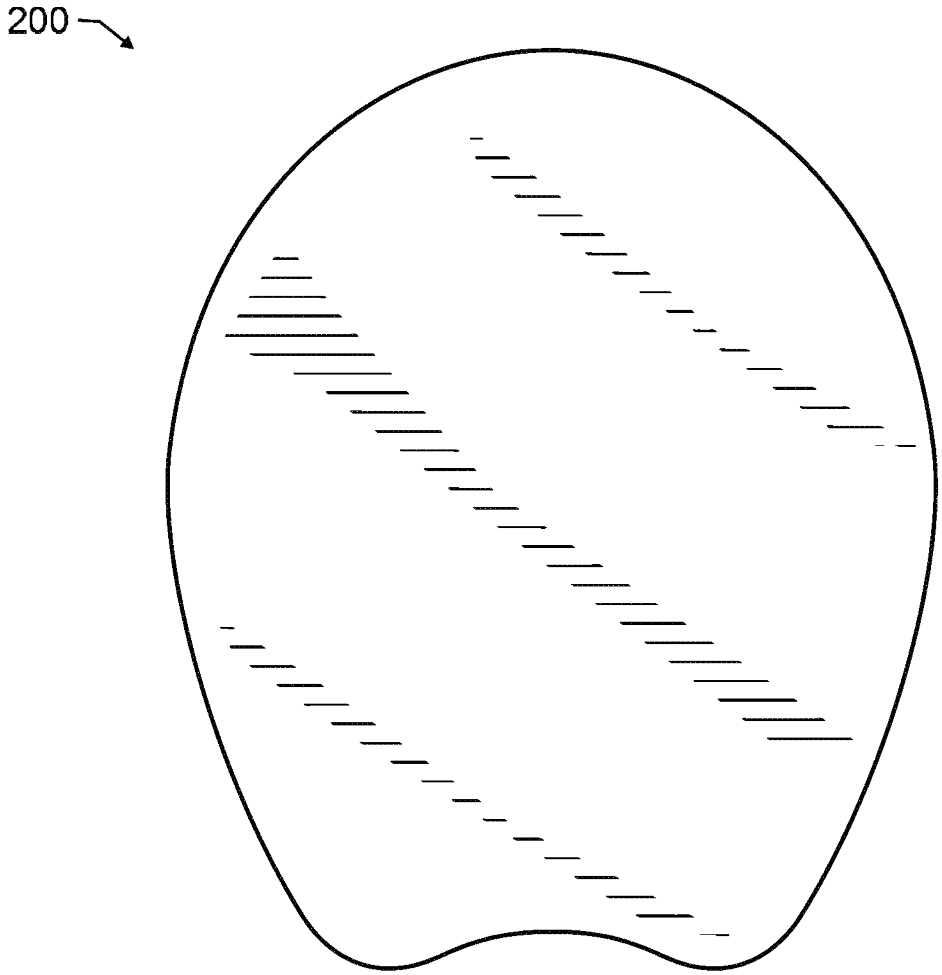
FIG. 13 illustrates the preferred embodiment pad of FIG. 11 from a top view.

Preferred embodiment molded sole 100 may optionally be provided with a preferred embodiment pad 200, such as illustrated in FIGS. 11-13, that may be placed between the dog's paw and mid-base 120 as a bottom pad liner inside preferred embodiment trail boot 1. While such a pad may take many different geometries and materials, including a sheet liner, preferred embodiment pad 200 preferably is a form-fitting foam that has a geometry that conforms to the pad shape of the dog's foot and which engages in corresponding features found within preferred embodiment molded sole 100. A generally planar portion 221 forms the primary web which interconnects or binds together each of a plurality of digital pads 222, 223, 224, 225 and a metatarsal or metacarpal pad 226. Since generally planar portion 221 is relatively thinner than these pads 222-226, and since there is a small gap between each adjacent one of pads 222-226, this has the effect of creating flexure grooves 231, 232, 233, 234 between the pads. As may be apparent then, preferred embodiment pad 200 will not interfere with the relatively independent flexure of each of the cups 122-126 in preferred embodiment molded sole 100.

Most preferably, preferred embodiment pad 200 will be fabricated from a material with a high coefficient of friction to keep the insert in place. The combination of mating geometry and relatively high coefficient of friction will in some cases be sufficient to maintain preferred embodiment pad 200 in position relative to preferred embodiment molded sole 100. Nevertheless, in an alternative embodiment pad 200 may be affixed to preferred embodiment molded sole 100, such as with temporary or permanent adhesive, fasteners of all sorts including hook and loop and all other known and suitable types, sewing, welding or other suitable technique.

Preferred embodiment pad 200 may provide protection against the environment and elements, such as but not limited to adding puncture resistance, thermal barrier, and other desired characteristics. This may for exemplary and non-limiting purposes be achieved in alternative embodiments by providing appropriate layers within generally planar portion 221, or in an alternative embodiment by providing appropriate layers adjacent to generally planar portion 221. If a dog owner wants cooling, heating, or penetration protection they would then put in a particular type of preferred embodiment pad 200 having a suitable layer or layers within or adjacent to generally planar portion 221 designed for and configured to provide the appropriate type(s) of protection.

Preferred embodiment pad 200 will also preferably collapse under the weight of the dog sufficiently so that pads 222-226 not only fit within pad cups 122-126, but also provide sufficient space within pad cups 122-126 to still receive a dog's pads therein. The use of a foam material helps to ensure this conformance to the dog's paw geometry, and can be used to enable a standard boot to better conform to a greater variety of dog paw geometries.

Various embodiments of apparatus designed in accord with the present invention are illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Furthermore, for the purpose of the present illustrations, components of like appearance between the Figures will also be understood to have like numbering, other than the hundreds digit, whether explicitly numbered in the present Figures or not. Consequently, those skilled in the art will readily determine the function and operation of many of the components illustrated herein without unnecessary additional description or Figure reference numerals.

FIGS. 14-31 illustrate several alternative embodiments of the present invention using standard CAD wireframe models. These therefore include lines (wires) that represent contour lines or the like as is well-established and known. Additional renderings are provided in FIGS. 32-36, and an inspection of both will provide the reader easier ability to resolve or distinguish between wires as a part of the wireframes, or openings or voids therein.

FIGS. 14-19 illustrate an alternative embodiment molded sole 300 that incorporates a full toe cap 310. Full toe cap 310 is preferred, owing to the added durability provided to a boot produced therefrom. The fact that toe cap 310 is closed is most evident in FIGS. 14 and 15, where it is apparent that toe cap 310 blocks the view of the features of mid-base 320, including in particular all of the digital pad cups in FIG. 14 and digital pad cups 323, 324 in FIG. 15.

Nevertheless, in alternative embodiments contemplated herein the toe cap may have vent holes or larger openings therein. As may be appreciated, the geometry and dimension of such holes or openings are simply too great to individually enumerate herein. Nevertheless, such vent holes or larger openings are understood to be fully incorporated herein.

Figure 14:
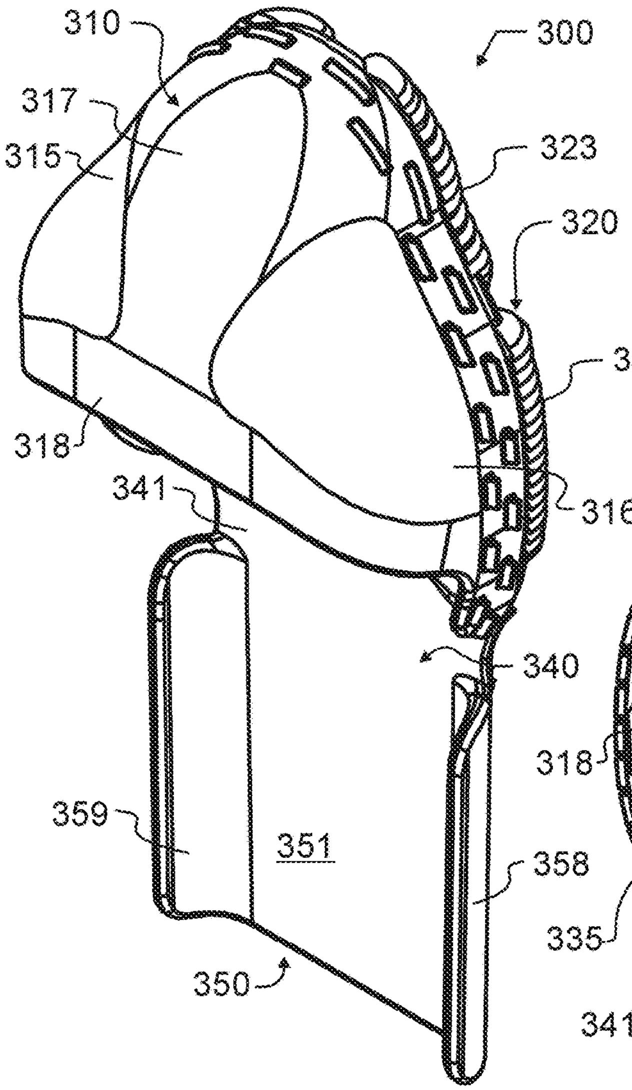
FIG. 14 illustrates an alternative embodiment molded sole designed in accord with the teachings of the present invention from a top projected view.
Figure 15:
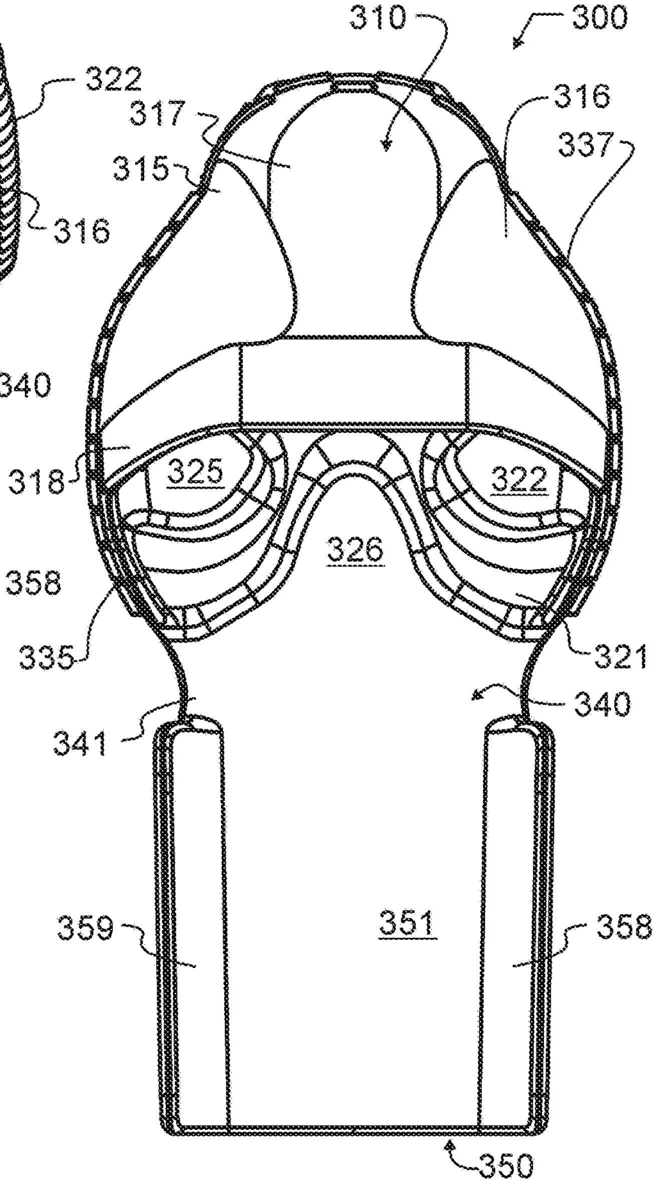
FIG. 15 illustrates the alternative embodiment molded sole of FIG. 14 from a top plan view.
Figure 16:
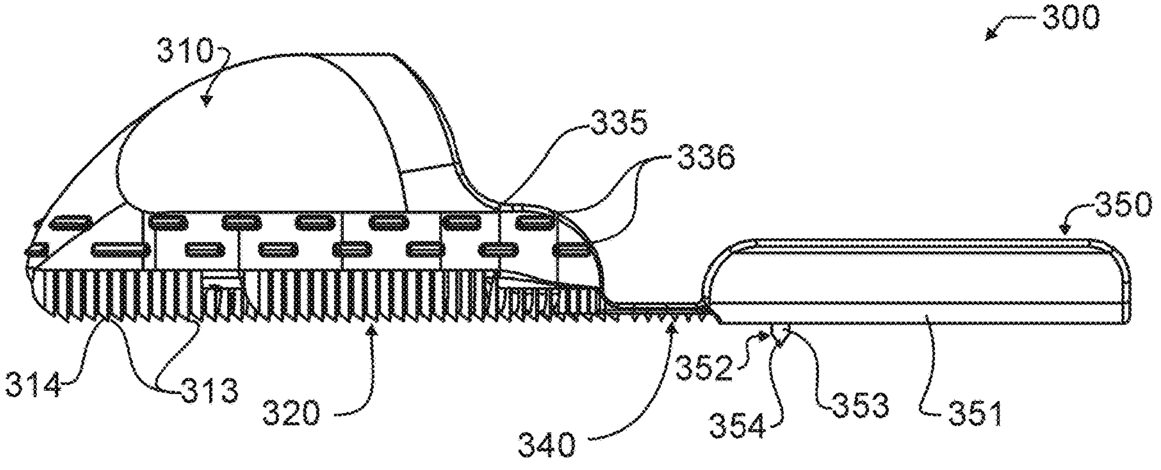
FIG. 16 illustrates the alternative embodiment molded sole of FIG. 14 from a side elevational view.
Figure 17:
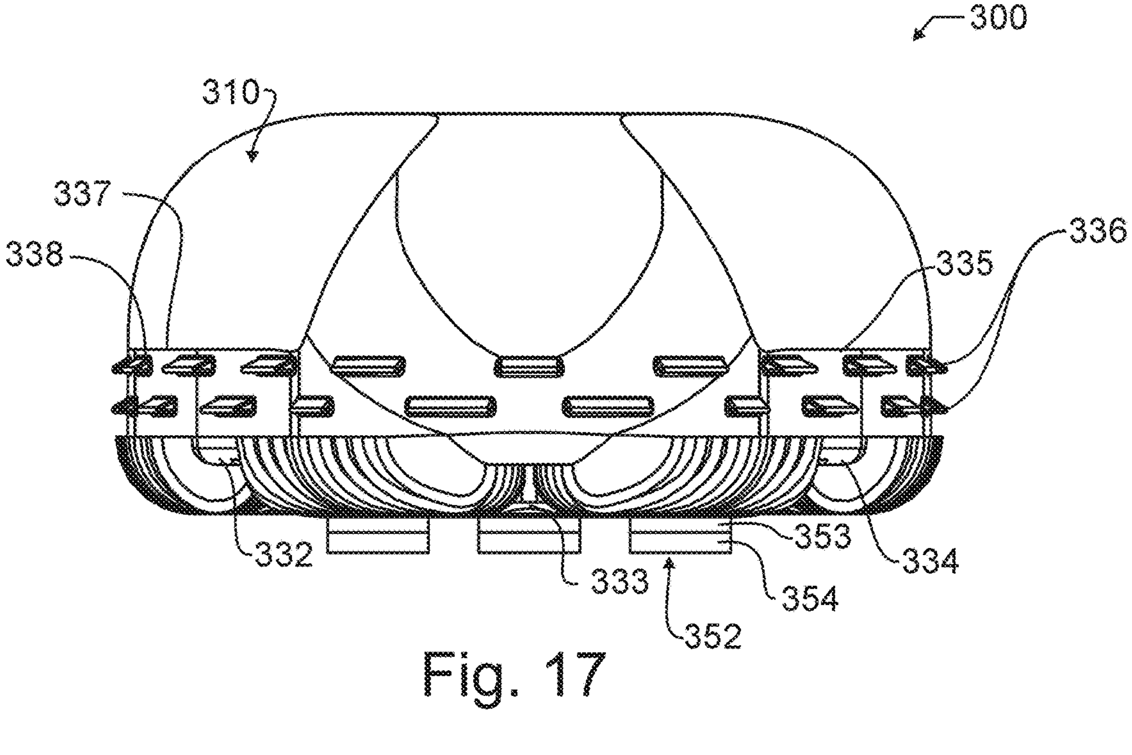
FIG. 17 illustrates the alternative embodiment molded sole of FIG. 14 from a front elevational view.
Figure 20:
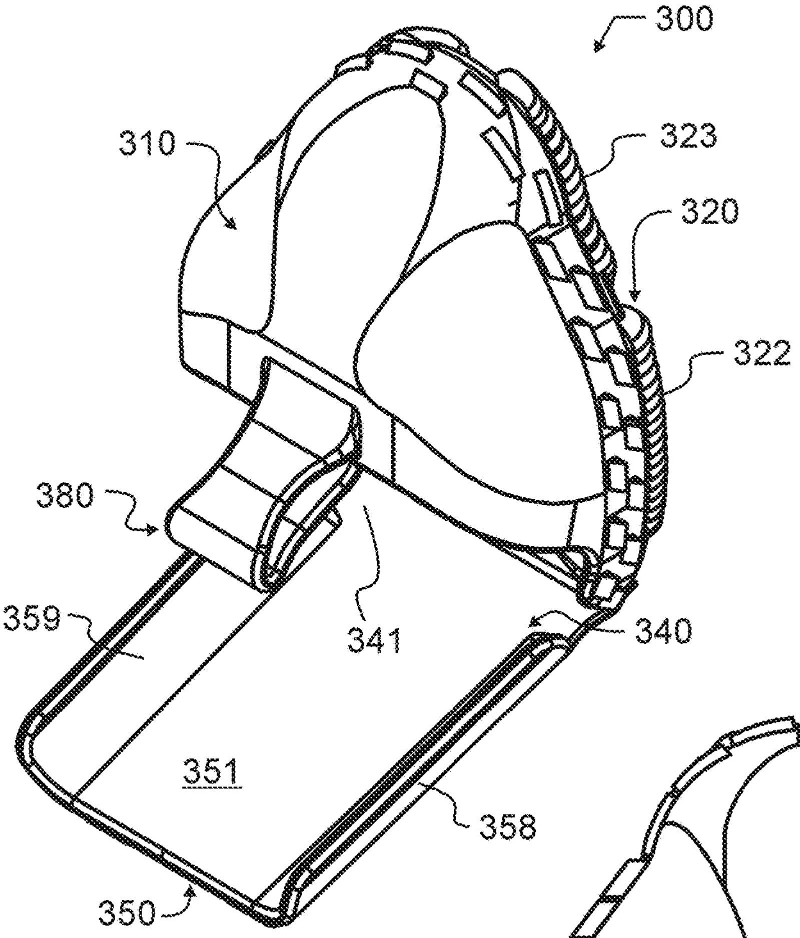
FIG. 20 illustrates the alternative embodiment molded sole of FIG. 14 from a top projected view, and with the dog leg region in an elevated position, similar to when being worn by a dog.
Figure 21:
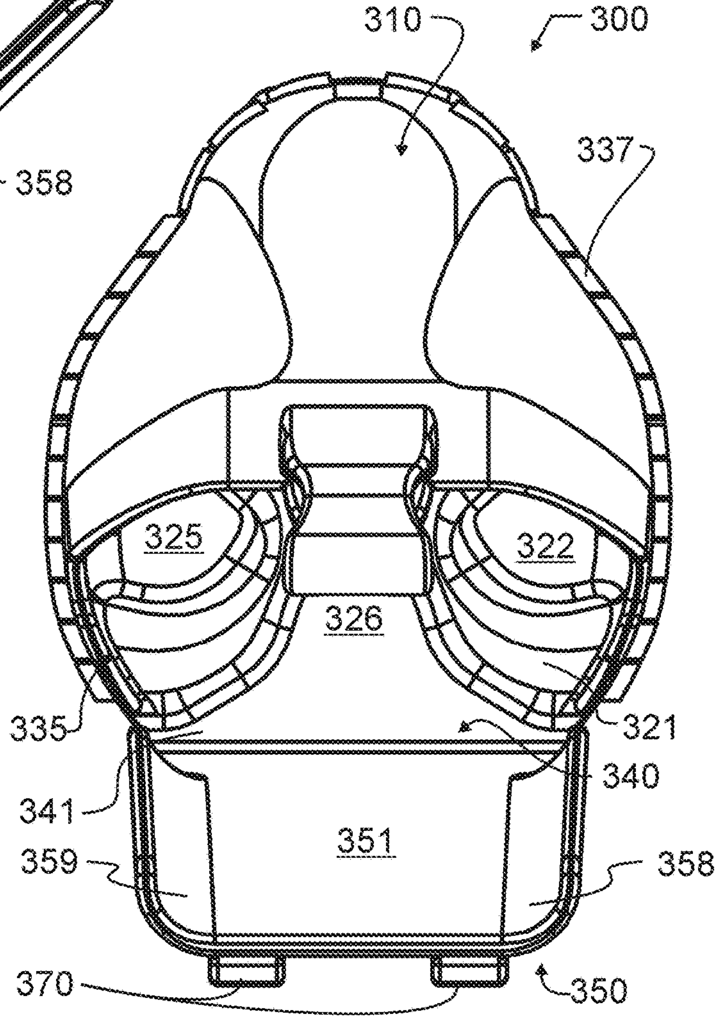
FIG. 21 illustrates the alternative embodiment molded sole of FIG. 20 from a top plan view.
Figure 22:
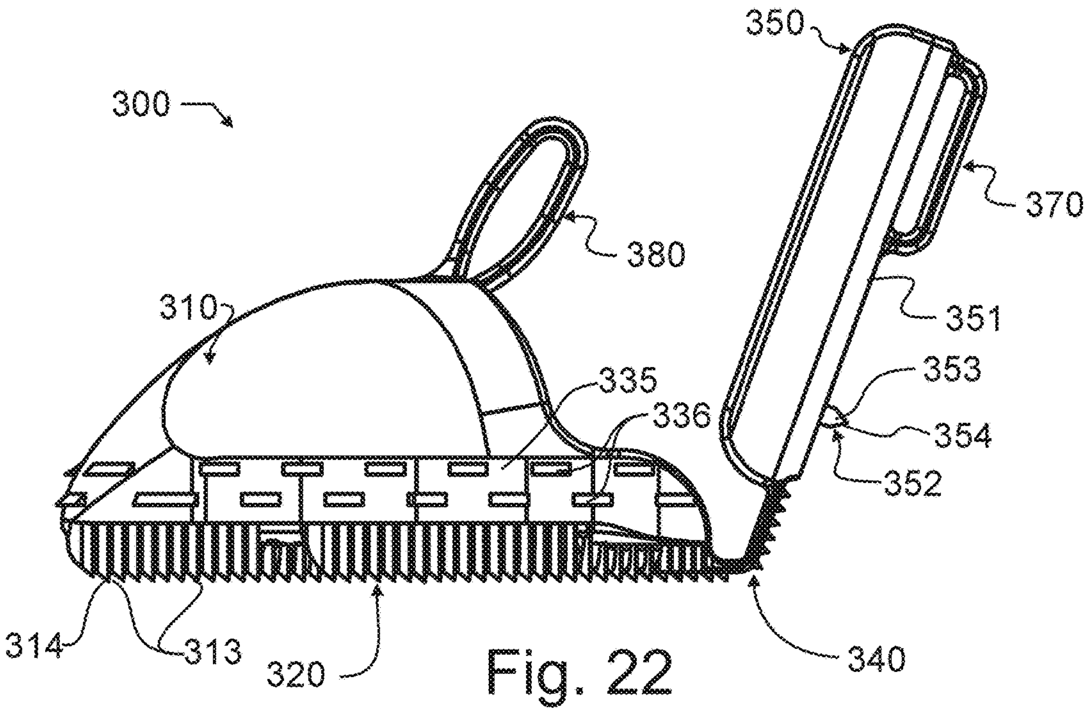
FIG. 22 illustrates the alternative embodiment molded sole of FIG. 20 from a side elevational view.
Figure 23:
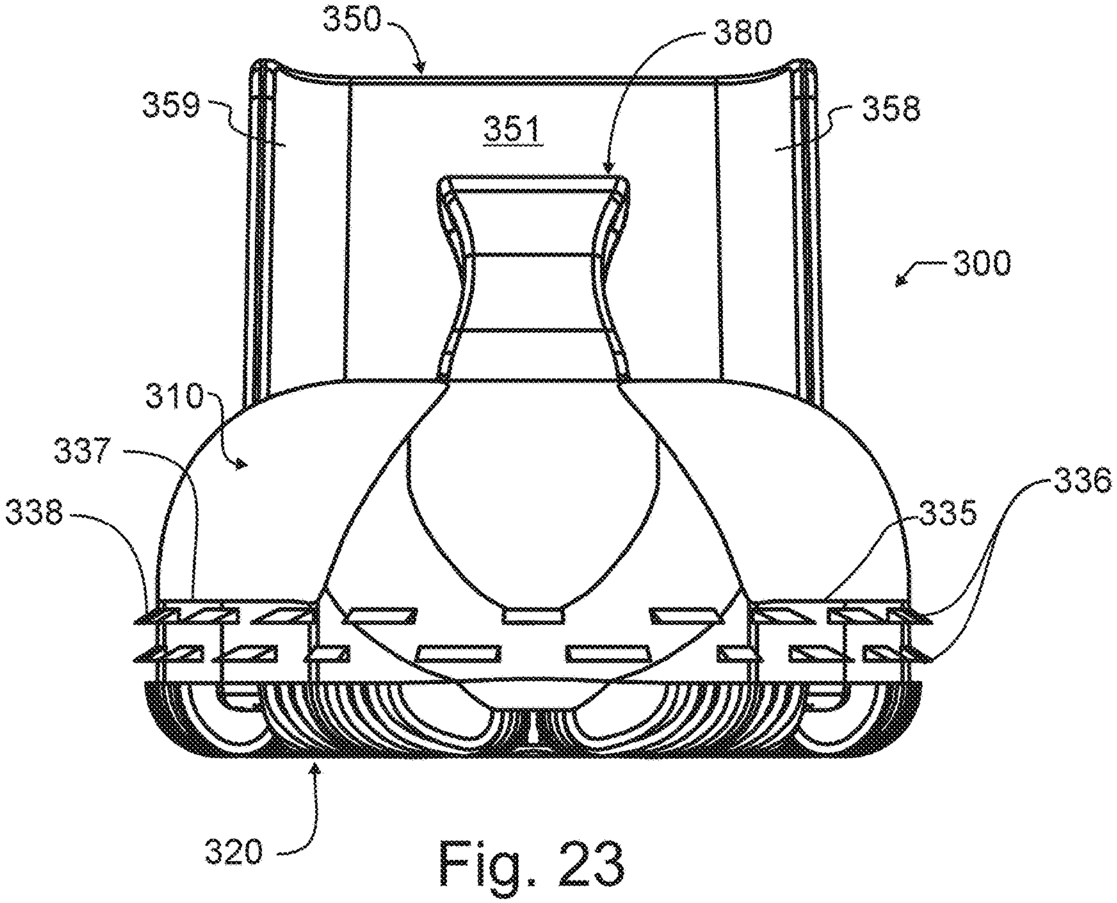
FIG. 23 illustrates the alternative embodiment molded sole of FIG. 20 from a front elevational view.
Figure 24:
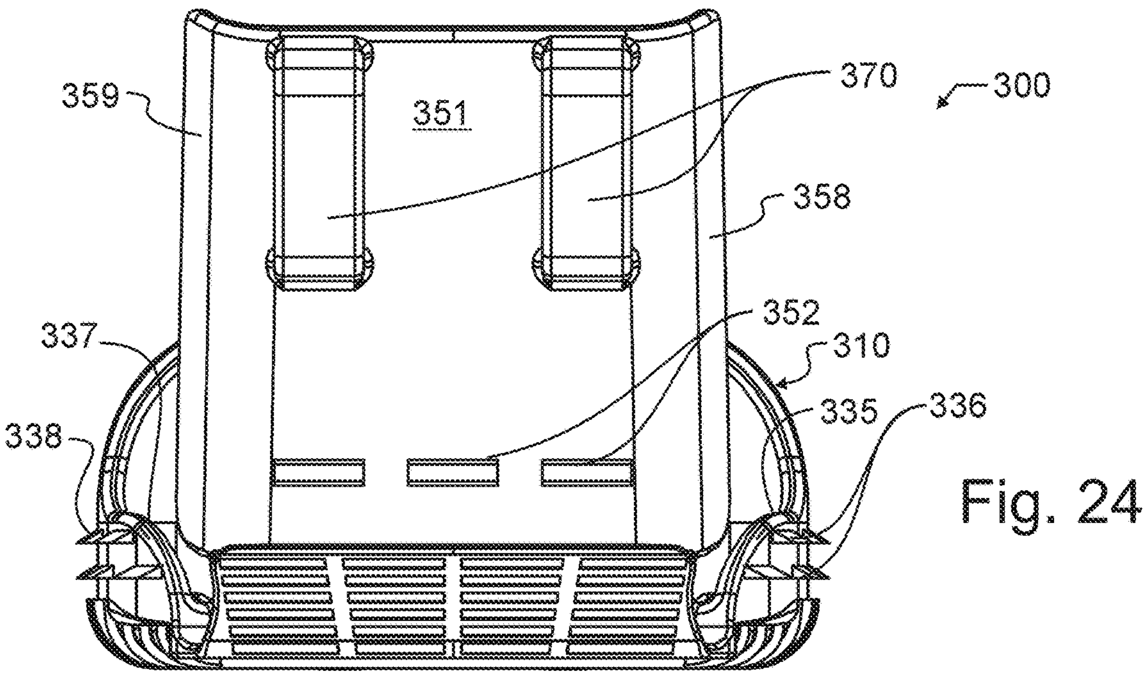
FIG. 24 illustrates the alternative embodiment molded sole of FIG. 20 from a rear elevational view.
Figure 25:
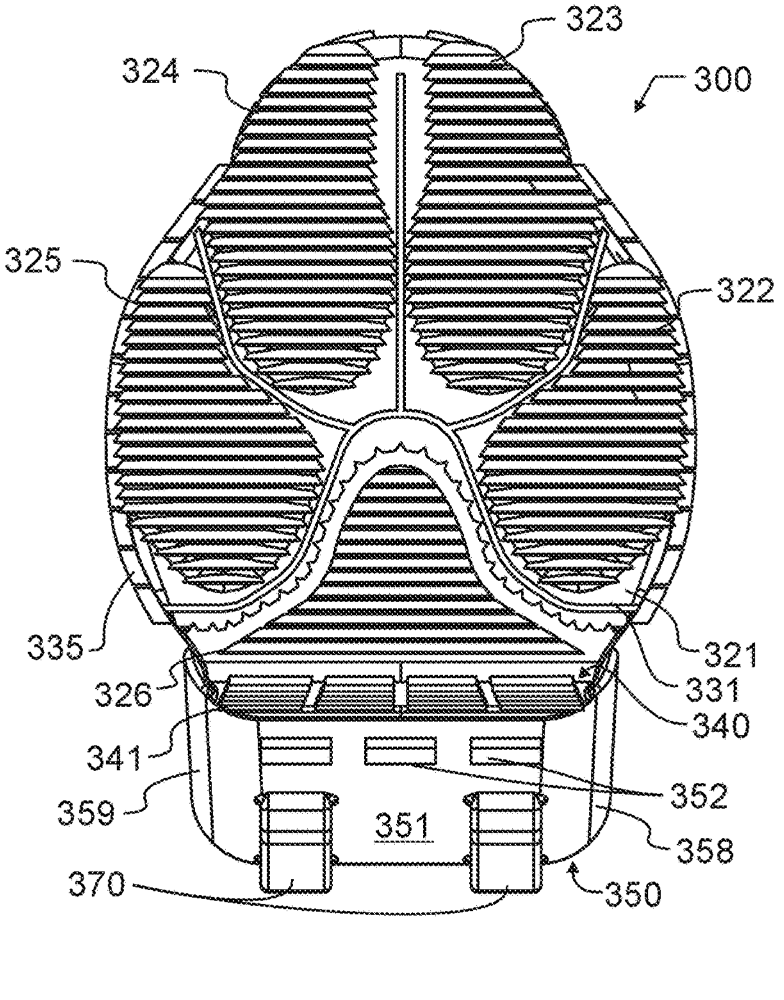
FIG. 25 illustrates the alternative embodiment molded sole of FIG. 20 from a bottom plan view showing the exterior surface of the sole.
Figure 26:
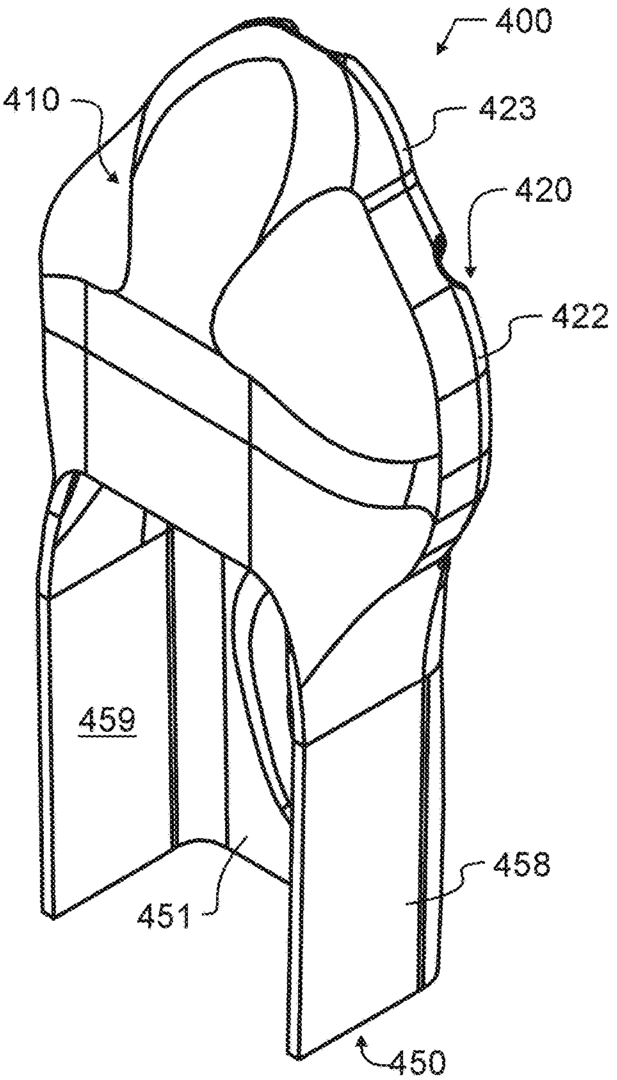
FIG. 26 illustrates a preferred embodiment molded liner designed in accord with the teachings of the present invention from a top projected view.
Figure 27:
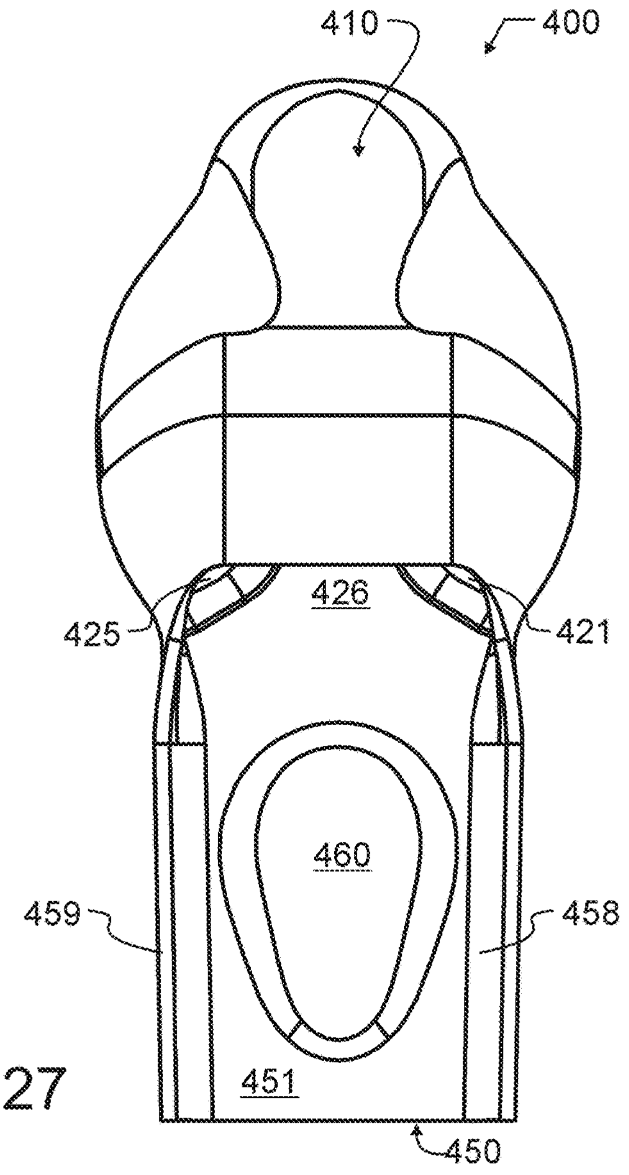
FIG. 27 illustrates the preferred embodiment molded liner of FIG. 26 from a top plan view.
Figure 28:
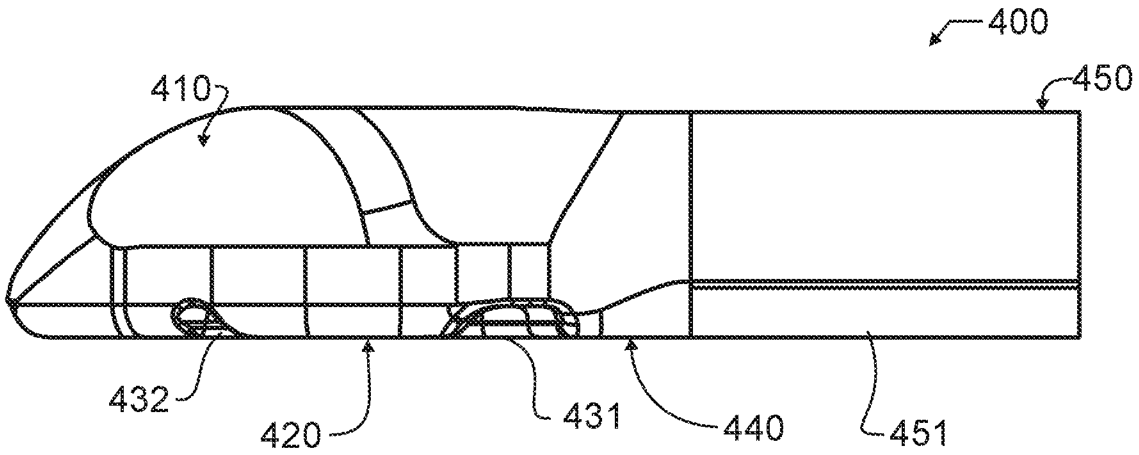
FIG. 28 illustrates the preferred embodiment molded liner of FIG. 26 from a side elevational view.
Figure 29:
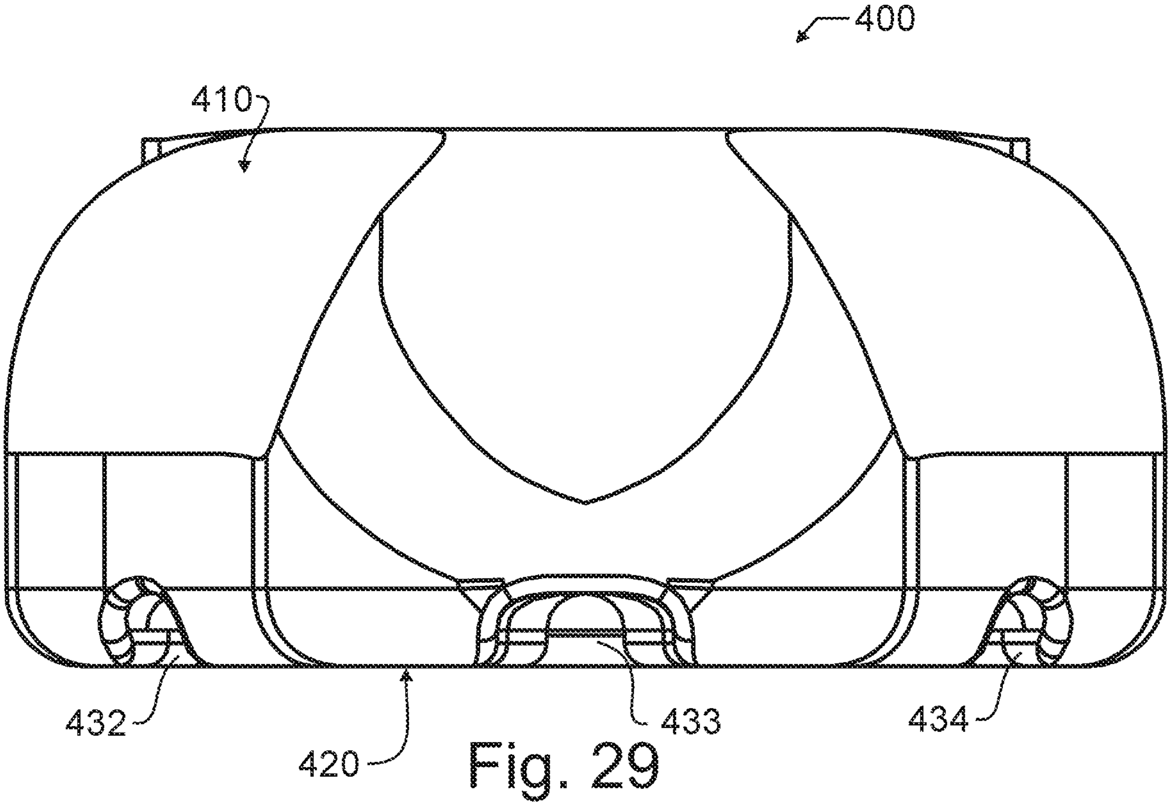
FIG. 29 illustrates the preferred embodiment molded liner of FIG. 26 from a front elevational view.
Figure 30:
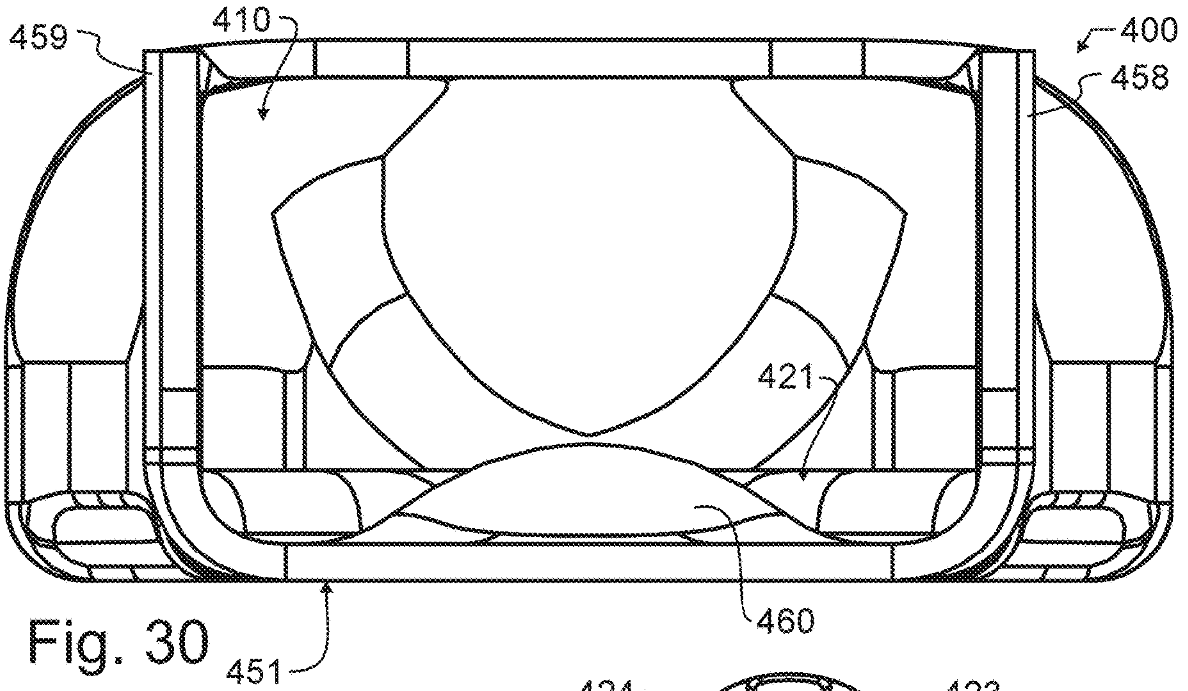
FIG. 30 illustrates the preferred embodiment molded liner of FIG. 26 from a rear elevational view.
Figure 31:
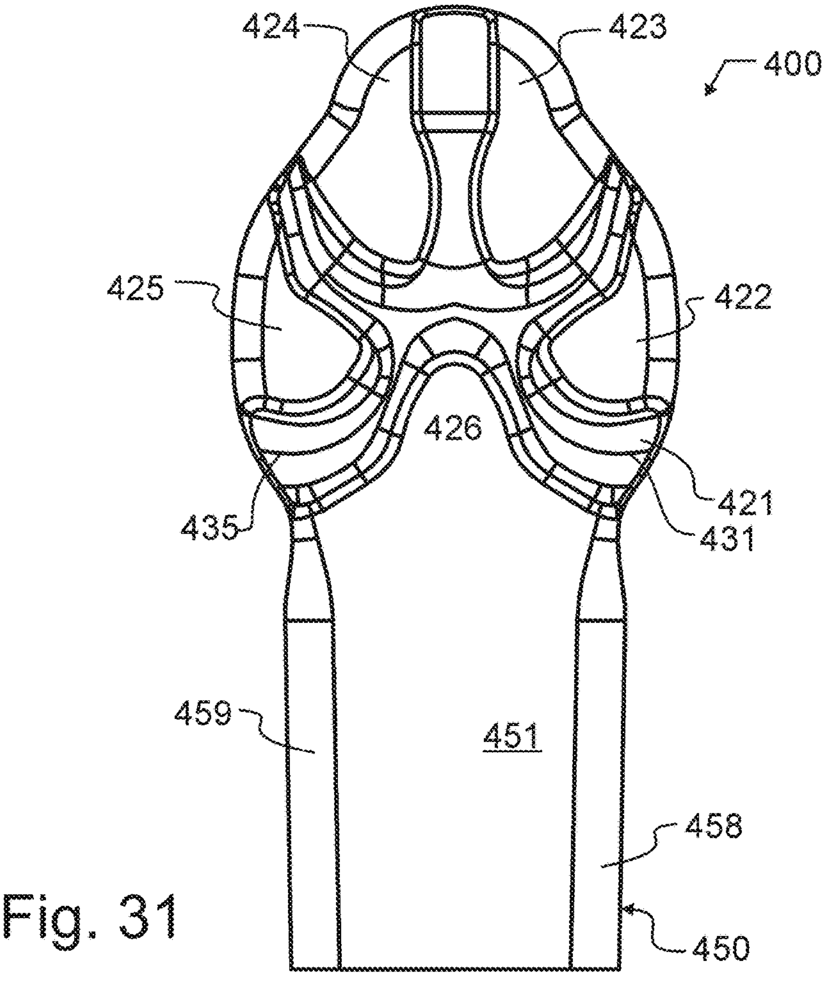
FIG. 31 illustrates the preferred embodiment molded liner of FIG. 26 from a bottom plan view showing the exterior surface of the sole.

For exemplary purposes only, and not solely limiting the present invention thereto, in one alternative embodiment toe cap panels 315, 316 visible in FIGS. 14 and 15 may be removed, leaving only toe cap longitudinal strap 317 and toe cap transverse strap 318. As may be recognized, the resulting toe cap geometry closely resembles that of a human sandal. Much like the human sandal, the benefit is greater ventilation and comfort for a dog in hotter and more humid environments.

Molded sole 300 also has a continuous set of sidewall treads 336, 338 that wrap around the tip and both of sidewalls 335, 337. These perform in the same manner as the sidewall treads 136, 138, and treads 112 of preferred embodiment molded sole 100.

FIGS. 20-25 illustrate the alternative embodiment molded sole 300 of FIGS. 14-19 with the dog leg region in an elevated position, similar to when being worn by a dog. In these illustrations, alternative embodiment molded sole 300 further comprises several optional features including a pair of strap loops 370 and a pull tab 380. One or any plurality of strap loops 370 may be provided integrally with or otherwise affixed to tail 350. As illustrated, a pair of strap loops 370 are provided near to the top end of tail 350, distal to mid-base 320, and additionally on spaced-apart edges of generally planar portion 351. These strap loops 370 as illustrated provide a convenient support for an upper strap 30, and the lower edge of strap loops 370 most adjacent to mid-base 320 form an upper stop for a lower strap 40. Treads 352 form the lower stop for lower strap 40. Additional treads such as treads 155 illustrated in molded sole 100 may be provided in alternative embodiments.

One or more pull tabs 380 may be provided integrally, as done in alternative embodiment molded sole 300, or otherwise formed and affixed thereto. The incorporation of additional features for slightly greater tooling cost is far offset by the lack of further labor required for assembly. Nevertheless, depending upon the materials selected and capabilities of various molding techniques and fabricators, there may be some features that will not be provided in all embodiments.

The location of the one or more pull tabs 380 is not critical to the present invention, though preferred locations are at the trailing rim of toe cap 310 as illustrated in FIGS. 20-25, protruding from toe cap transverse strap 318, or at the uppermost portion of tail 350 such as illustrated by pull tabs 580 in FIGS. 35 and 36. These positions generally provide a person with more optimal application of force to pull a boot onto a dog and properly position the boot thereon.

Figure 34:
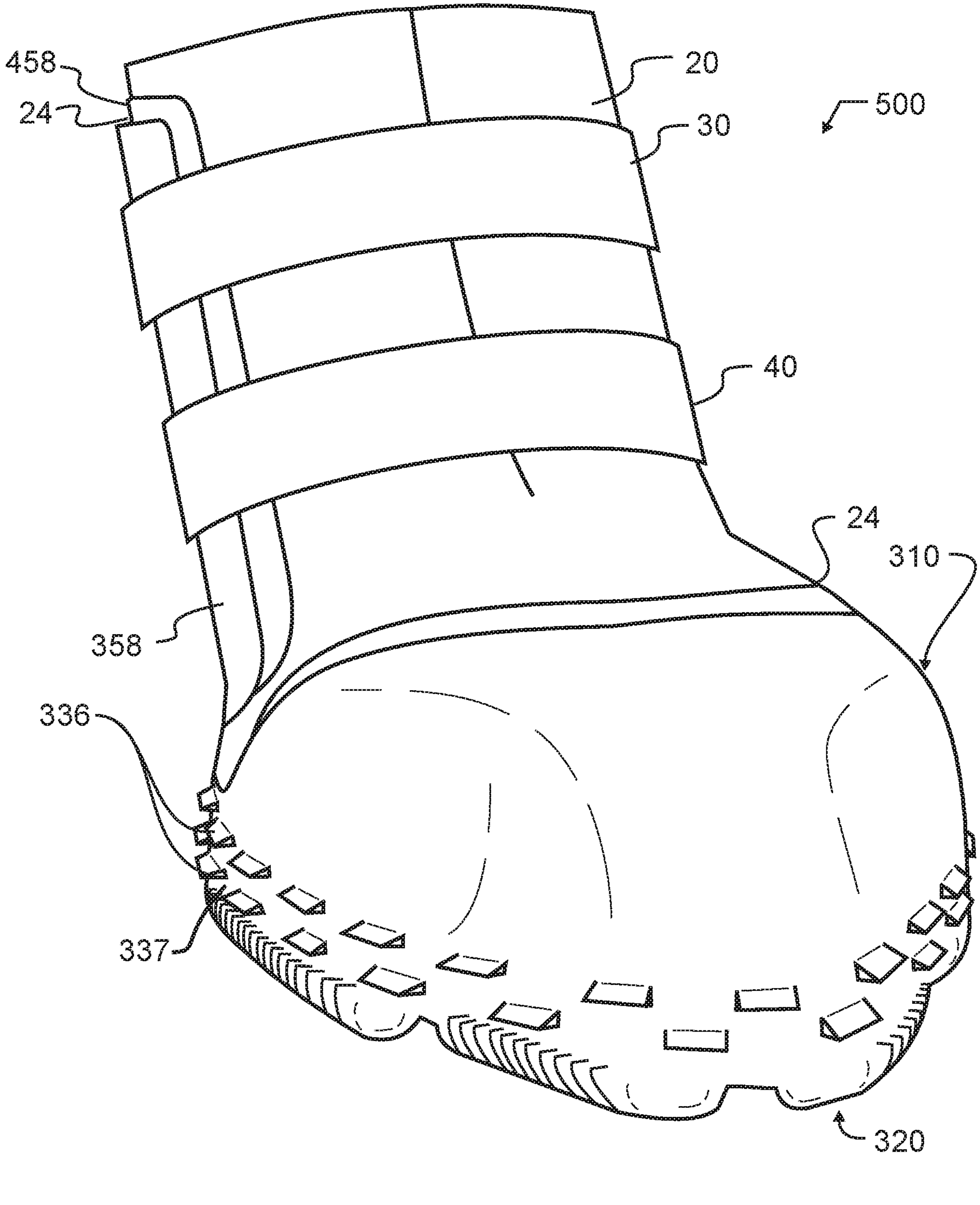
FIG. 34 illustrates the preferred embodiment combination molded liner of FIG. 26 and alternative embodiment molded sole of FIG. 20 in further combination with a preferred embodiment upper, from a front and top projected view.

While molded sole 300 incorporates many of the features found in molded sole 100, molded sole 300 is notably lacking raised cushioning pad 160. In some applications, molded sole 100 may preferably be fabricated from a more durable and dense elastomeric material, and in such instances and others, a preferred embodiment liner 400 such as illustrated in FIGS. 26-31 may be provided that in some embodiments will be inserted within and affixed to molded sole 300, such as by sewing as illustrated in FIG. 34, by adhesive, hook-and-loop, or other suitable permanent or removable fastener, or other technique selected from the myriad of known fastening techniques. In other embodiments, liner 400 may be formed directly onto molded sole 300 through an overmolding process. In yet further embodiments, liner 400 may simply be inserted within molded sole 300, and may be removable therefrom such as for replacement or particular fitting to a dog.

When liner 400 is overmolded to molded sole 300, the labor required for assembly of a boot may be reduced. However, if liner 400 is separable from molded sole 300, a boot so fabricated may be customized either at a factory or by a purchaser to provide an optimum placement of raised cushioning pad 460. In one embodiment, this may be achieved by providing several liners 400, each with a different placement of raised cushioning pad 460. One liner may locate raised cushioning pad 460 more nearly adjacent to metatarsal or metacarpal pad 326, while another may locate this same raised cushioning pad farther therefrom. In further alternative embodiments, in addition to varying the location of raised cushioning pad 460, the size or geometry of raised cushioning pad 460 may also be varied. For exemplary purposes only, and not solely limiting the present invention thereto, this customization of liner 400 may permit a boot such as boot 500 fabricated therefrom to be custom sized, either for a particular dog breed or even to a particular dog. In such cases, the number of molds required for the molded sole will be few, and more of the generally less expensive and often longer lasting molds used to form a lighter, more foraminous or foamed liner 400 may be fabricated.

The combination of a higher density molded sole 300 with a lower density liner 400 offers several additional benefits. A high density material used in molded sole 300 may be selected to be much more durable, puncture resistant, and have other desirable characteristics than could be achieved with a lower density material. However, a trail boot will preferably be fabricated from a sufficiently low overall density so as to float if dropped into water. A boot having only a high density molded sole 300 may not float, but when combined with a low density liner 400, the boot may then float.

A lower density liner 400 may also offer custom shaping under load that better conforms to a dog's foot, and so is more comfortable for the dog. For longer walks such as may be required on trails or in the case of service dogs, this better conformance and additional cushioning may help to ensure the dog may continue to fulfill the valuable service role.

In addition, the combination high density molded sole 300 and low density liner 400 will also tend to transmit less thermally energy, thereby better protecting the dog's paws from both hot and cold surfaces than could otherwise be achieved with only a single density material having adequate durability to be worn as an exterior layer.

Molded liner 400 will preferably be manufactured with many of the features found in molded sole 300, and so as illustrated may be provided with sidewalls 458, 459, and digital pad cups 422-425 that correspond to and so engage with digital pad cups 322-325.

Figure 32:
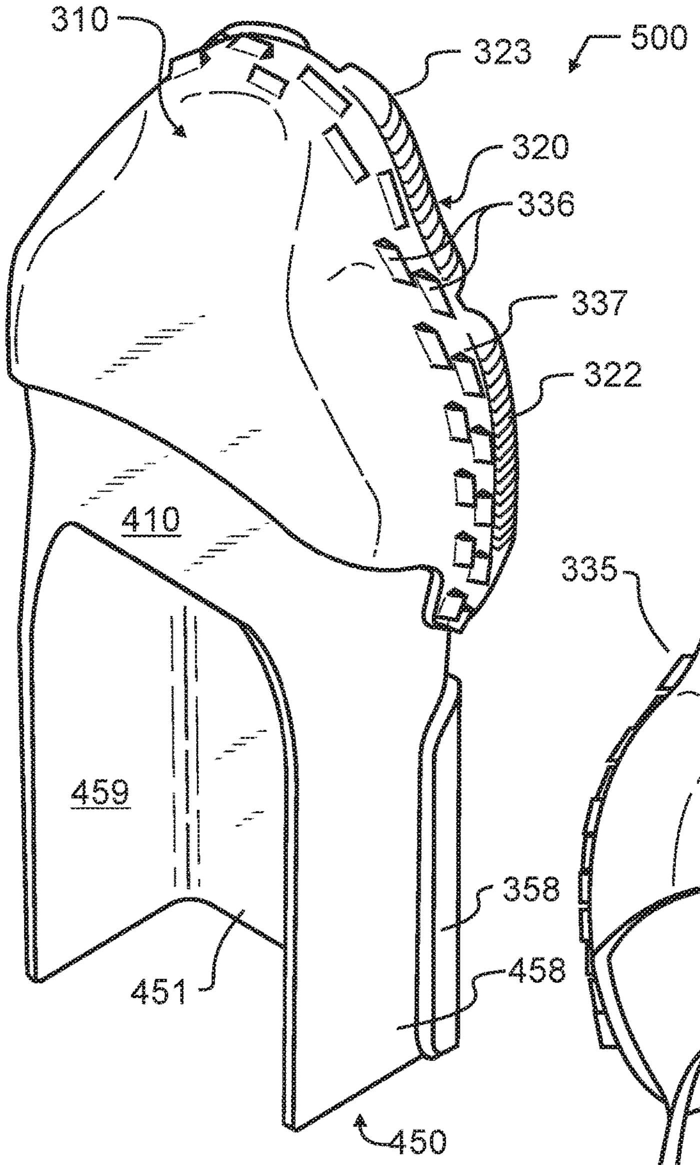
FIG. 32 illustrates the preferred embodiment molded liner of FIG. 26 in further combination with the alternative embodiment molded sole of FIG. 20 from a top projected view.
Figure 33:
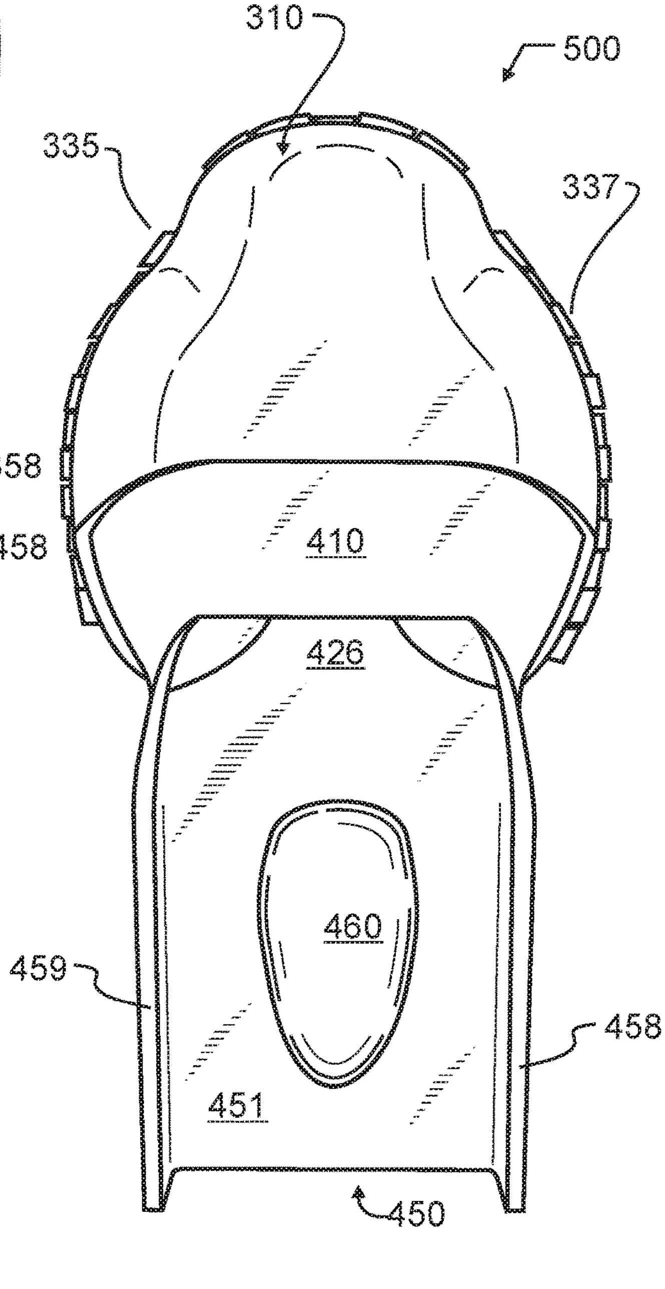
FIG. 33 illustrates the preferred embodiment combination molded liner of FIG. 26 and alternative embodiment molded sole of FIG. 20 from a top plan view.

FIGS. 32 and 33 illustrate a boot 500, but without boot upper 20 or straps 30, 40. As may be apparent, liner 400 will most preferably have a geometry that corresponds to the interior of molded sole 300, and so may fit will therein. While liner 400 is illustrated as having full-height side walls extending entirely from the end of tail 450 distal to toe cap 410, it will be appreciated that such side walls may undesirably buckle when tail 350 and tail 450 are raised to an angle relative to mid-bases 320, 420. To prevent such buckling, liner 400 may either be fabricated with notches or cut-outs similar to those found at tail sidewalls 358, 359 in the vicinity of metatarsal or metacarpal pad rear wall 140, or such notches or cut-outs may be formed through a post-molding operation.

As may also be apparent, both liner toe cap 410 and tail side walls 458, 459 protrude from the like counterparts in molded sole 300. Where liner 400 is sufficiently durable and also rigidly or preferably permanently affixed with molded sole 300, then upper 20 may be affixed directly to liner 400. This can greatly simplify a sewing operation to secure upper 20, since the more dense elastomeric or rubber material that might be used for molded sole 300 may be very difficult to sew through.

FIG. 34 illustrates a complete and exemplary boot 500, including upper 20 and straps 30, 40. As illustrated, upper 20 is sewn to liner 400 at seams 24.

FIGS. 35 and 36 illustrate molded liner 400 and alternative embodiment molded sole 300 to form an alternative embodiment boot 600. In boot 600, upper 20 is not sewn, and so instead may be adhesively, ultrasonically, or otherwise affixed to either liner 400 or preferably directly to molded sole 300.

Figure 37:
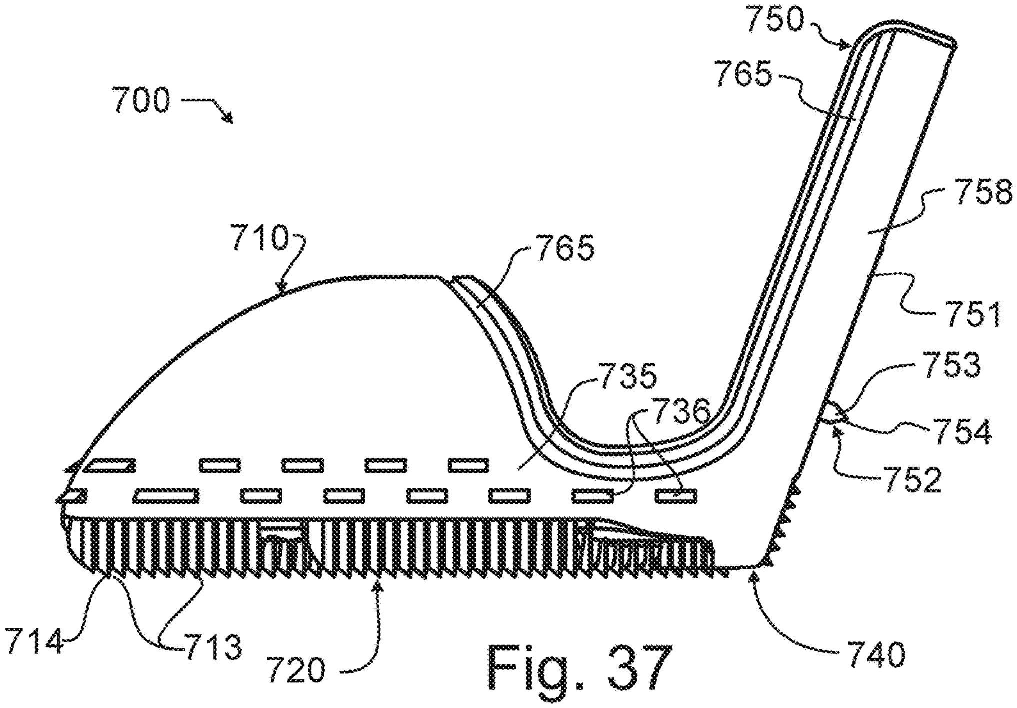
FIG. 37 illustrates an alternative embodiment molded sole similar to that of FIG. 20 from a side elevational view.
Figure 38:
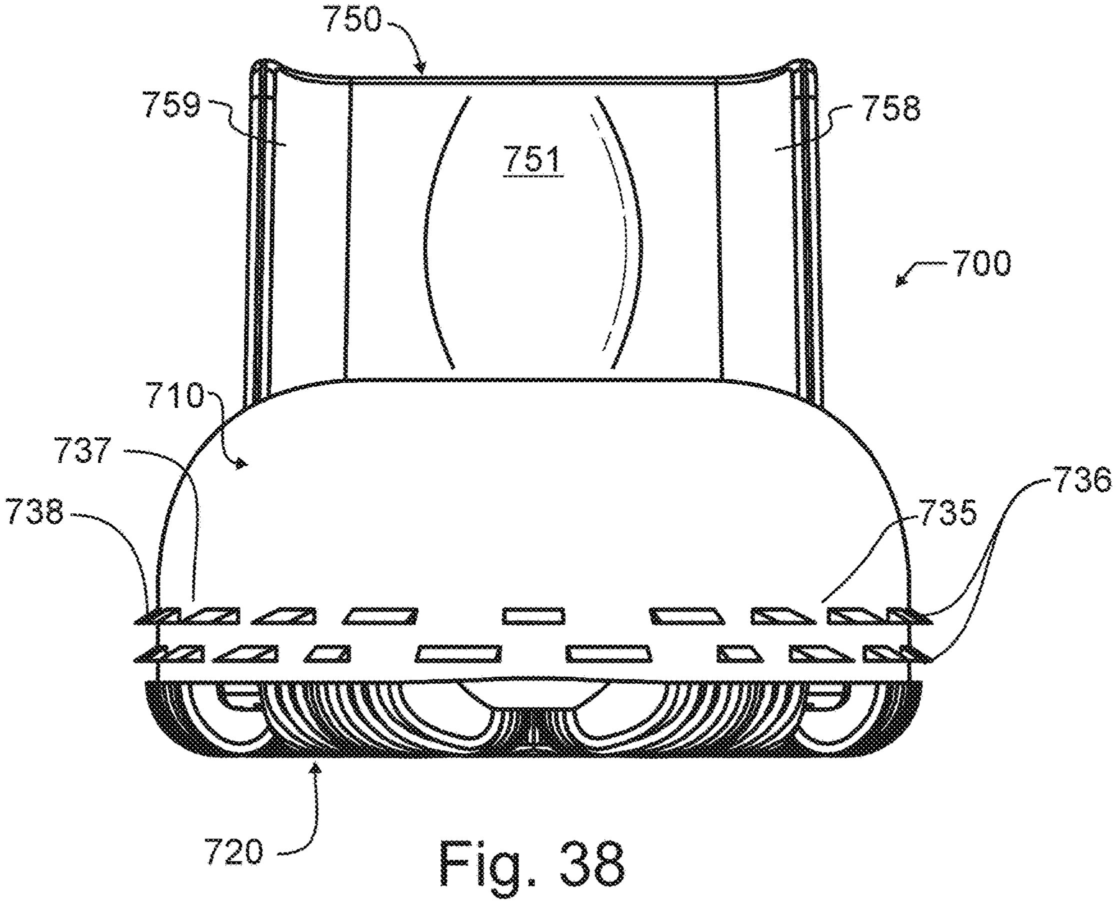
FIG. 38 illustrates the alternative embodiment molded sole of FIG. 37 from a front elevational view.

FIGS. 37 and 38 illustrates an alternative embodiment molded sole 700 similar to that of molded sole 300 illustrated in FIGS. 20-23. However, there are two features found in molded sole 700 that are absent from molded sole 300. The first is that sidewalls 735, 737 are continuous with tail sidewalls 758, 759. In contrast, there is a distinct gap between sidewalls 335, 337 and tail sidewalls 358, 359. The lack of a gap between sidewalls 735, 737 and tail sidewalls 758, 759 makes the cutting of fabric for boot top 20 simpler.

In addition, a stitching groove 765 is provided surrounding the open perimeter of molded sole 700. Stitching groove 765 is a region of molded sole 700 that is thinner than surrounding material, making it easier to sew through stitching groove 765 and into the boot top 20 fabric. While a thinner region is preferred owing to the simplicity of fabrication, it will be understood that in alternative embodiments other techniques are incorporated, including for exemplary and non-limiting purposes in one alternative embodiment the provision of a second softer material overmolded and defining a stitching region, or in a second alternative embodiment a plurality of perforations designed to cooperate with a sewing machine to allow the needle to pass unimpeded through.

In some alternative embodiments contemplated herein, raised cushioning pad 160 described as preferably being in engagement with the dog's metatarsal or metacarpal pad adjacent to a ground surface will be adjustable to accommodate dogs having different leg geometry. In some of these alternative embodiments, raised cushioning pad 160 is affixed with a suitable fastener selected from the myriad of known fasteners including but not limited to permanent and removable fasteners. In one alternative embodiment, raised cushioning pad 160 is attached with hook and loop such as commercially sold under the Velcro trademark, with the loop material sewn on the back of the boot, and the hook attached to the foam pad. The foam cushioning pad in such case may further be provided with a slip cover such as plastic, paper, or other suitable material to allow a pet owner to slip the foam cushioning pad into the boot, position it, and then remove the slip cover for ease of attachment. This slip cover allows a person to easily set the cushioning pad and then not have to think about or adjust the cushioning pad again. A slip cover of this type may be used with various other permanent and removable fasteners.

Figure 39:
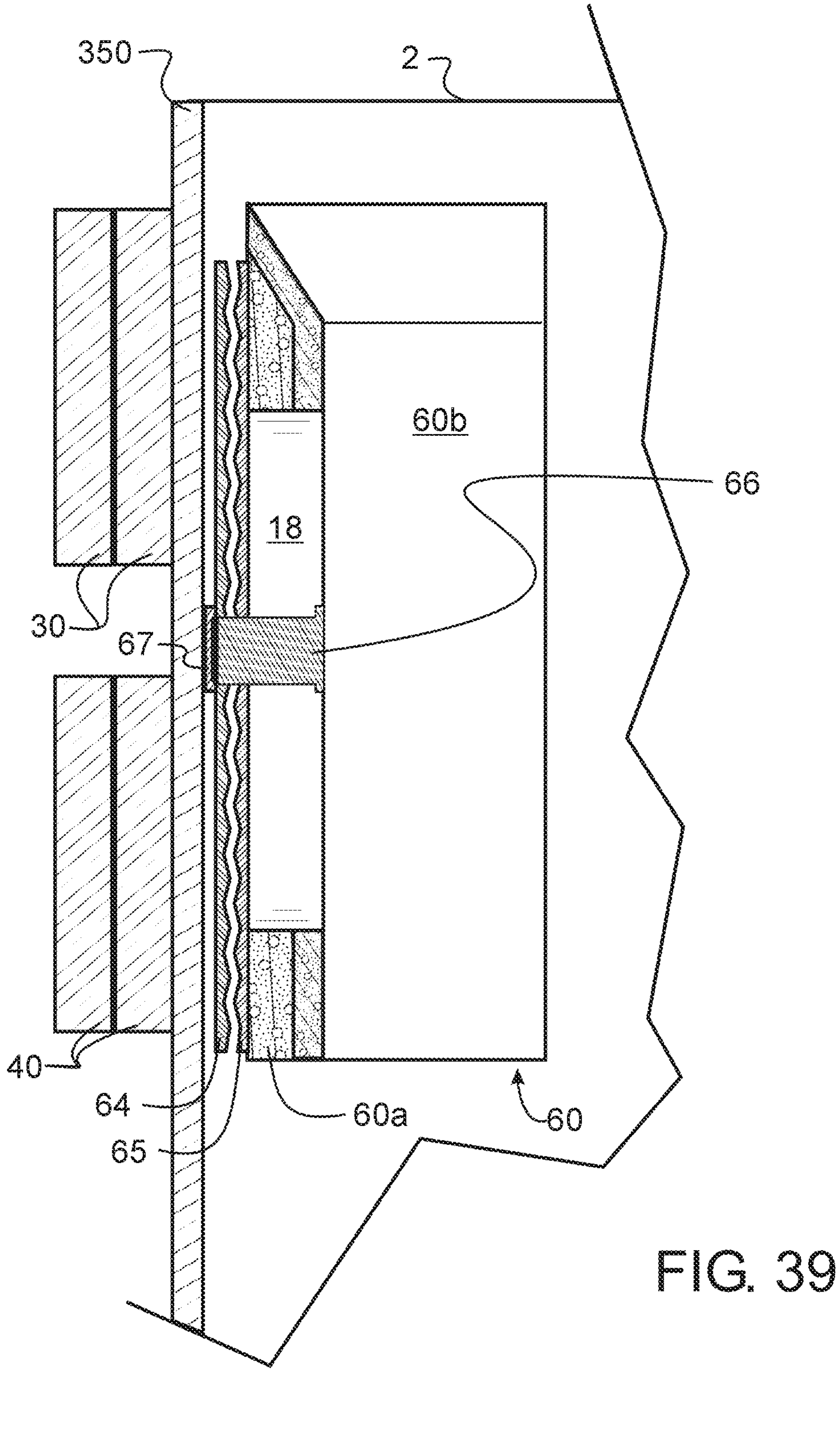
FIG. 39 illustrates a preferred embodiment adjustable cushioning pad within the region of an exemplary dog boot adjacent the open upper end by enlarged sectional and partial cut-away view, using a sagittal sectioning plane.

In another alternative embodiment illustrated in FIG. 39, an adjustable cushioning pad 60 is provided within the upper region of an exemplary dog boot adjacent open end 2, for exemplary purposes demonstrated with molded sole 300, but suitable for use in many different dog boot constructions. In this embodiment, adjustable cushioning pad 60 may comprise one or more of a variety of foams and foam rubbers, though closed cell polyurethane and neoprene are preferred, for their combination of low cost, ready availability, water resistance, and high coefficient of friction with many surfaces and materials. This latter coefficient of friction will help to ensure that boot 1 stays in place without requiring excessive forces be applied to straps 30, 40. In one exemplary and non-limiting alternative embodiment, another suitable material with similar characteristic is a silicone rubber, such as a low durometer RTV composition. In another alternative embodiment, a suitable material is a gel, whether formulated from silicone or other elastic, viscoelastic, elastomeric, or other composition. While adjustable cushioning pad 60 may comprise a single material, in a further alternative embodiment illustrated for exemplary purposes in this FIG. 39, adjustable cushioning pad 60 may be formed from two or more compositions. In this exemplary alternative embodiment, a foam core **60*a* has been overmolded with a second material 60*b* having a desirable characteristic. In one suitable alternative embodiment, one such combination comprises a foam core 60*a*** that has been overmolded with silicone rubber 60*b*, though there are too many other possible combinations to individually describe herein.

On an interior side of tail 350 is affixed a first engaging surface 64. A second engaging surface 65 is securely affixed to foam core 60*a*. Second engaging surface 65 is designed to engage with and readily secure to first engaging surface 64. This may be accomplished using a variety of known materials. For exemplary and non-limiting purposes, these first and second engaging surfaces 64, 65 may be fabricated from materials such as: well-known hook-and-loop fasteners such as are sold under the trademark Velcro®; materials having serrated or ribbed surfaces including those resembling the well-known metal file and rasp surfaces; diamond or pyramidal surfaces; and from other materials having a high static coefficient of friction. Illustrated are materials having a serrated edge. The serrated edges on the two opposing engaging surfaces 64, 65 prevent foam core 60*a* from being pushed up by the force of a dog's carpal pad during movement. This force is considerable and would force cushioning pad 60 toward open end 2 without some form of sufficient friction or stop between the two engaging surfaces 64, 65.

To engage first and second engaging surfaces 64, 65 securely together, a threaded bolt 66 may preferably engage within an interiorly threaded female coupler 67. Straps 30, 40 wrap around cushioning pad 60 and also put pressure on the pad, better helping to hold it in place. Preferably, both threaded bolt 66 and female coupler 67 are provided with a head sufficiently large in diameter to securely engage into the associated second material 60*b* and foam core 60*a*, respectively, and sink therein below the surface without pulling through. By sinking into foam core 60*a* and second material 60*b*, there is less chance that threaded bolt 66 would protrude interior beyond the carpal pad where the cushioning pad comes into contact with the leg. If it did protrude beyond the carpal pad, it might undesirably abrade the dog's leg.

While one or the other of threaded bolt 66 and female coupler 67 could pass through tail 350, in preferred embodiment boot 1 they do not. This helps, if desired, to retain a waterproof characteristic in this area.

If the fastener formed by threaded bolt 66 and female coupler 67 or an alternative is not sufficient to recess into the foam under pressure, either one or both of foam core 60*a* and second material 60*b* may be provided with a counter sink hole in the foam to recess the fastener heads. In a further alternative embodiment, the fastener formed by threaded bolt 66 and female coupler 67 or an alternative may be provided with a soft pliable head.

While a mechanical thread is preferred, a snap-together fastener or other known fastener type will be understood to be an equivalent. In the case of a snap-together fastener, for exemplary and non-limiting purpose having a similar geometry to threaded bolt 66 and female coupler 67 but without the threading, the two parts are simply pressed together and thereby locked in place.

In a further alternative embodiment, a snap having a first gentle hold and a second more permanent hold may be used to allow boot 1 to be assembled with the snap engaged in the first gentle hold position. In this case, upon delivery to a dog owner, the dog owner may adjust the first and second engaging surfaces 64, 65 to a desired position to best engage with the metatarsal or metacarpal pad, and thereby tailor preferred embodiment boot 1 to best fit on the dog. Then the dog owner can further bring the snaps together, to permanently hole them in place.

Where a hook-and-loop fastener is used for first and second engaging surfaces 64, 65, no separate fastener may be required.

In one further alternative embodiment, the interior surface of tail 350 is provided with or intrinsically has characteristics sufficient to eliminate any need for a separate first engaging surface 64. In the case of a hook-and-loop fastening system, for exemplary and non-limiting purpose, the interior of tail 350 may have sufficient loops to engage with a hook material found on second engaging surface 65. In another alternative embodiment, the interior of tail 350 may have a sufficient coefficient of friction to securely engage with second engaging surface 65. In such instances, first engaging surface 64 may be integral with tail 350. In this alternative embodiment, it may be necessary or desirable to run a portion of the fastener or coupler such as female coupler 67 entirely through tail 350.

In a further alternative embodiment, the surface of cushioning pad 60 facing tail 350 may be provided with or intrinsically have characteristics sufficient to eliminate any need for a separate second engaging surface 52. In the case of a hook-and-loop fastening system, for exemplary and non-limiting purpose, the surface of cushioning pad 60 facing tail 350 may have sufficient loops to engage with a hook material found on tail 350. In another alternative embodiment, the surface of cushioning pad 60 facing tail 350 may have a sufficient coefficient of friction to securely engage with tail 350. In such instances, second engaging surface 52 may be integral with cushioning pad 60.

Figure 40:
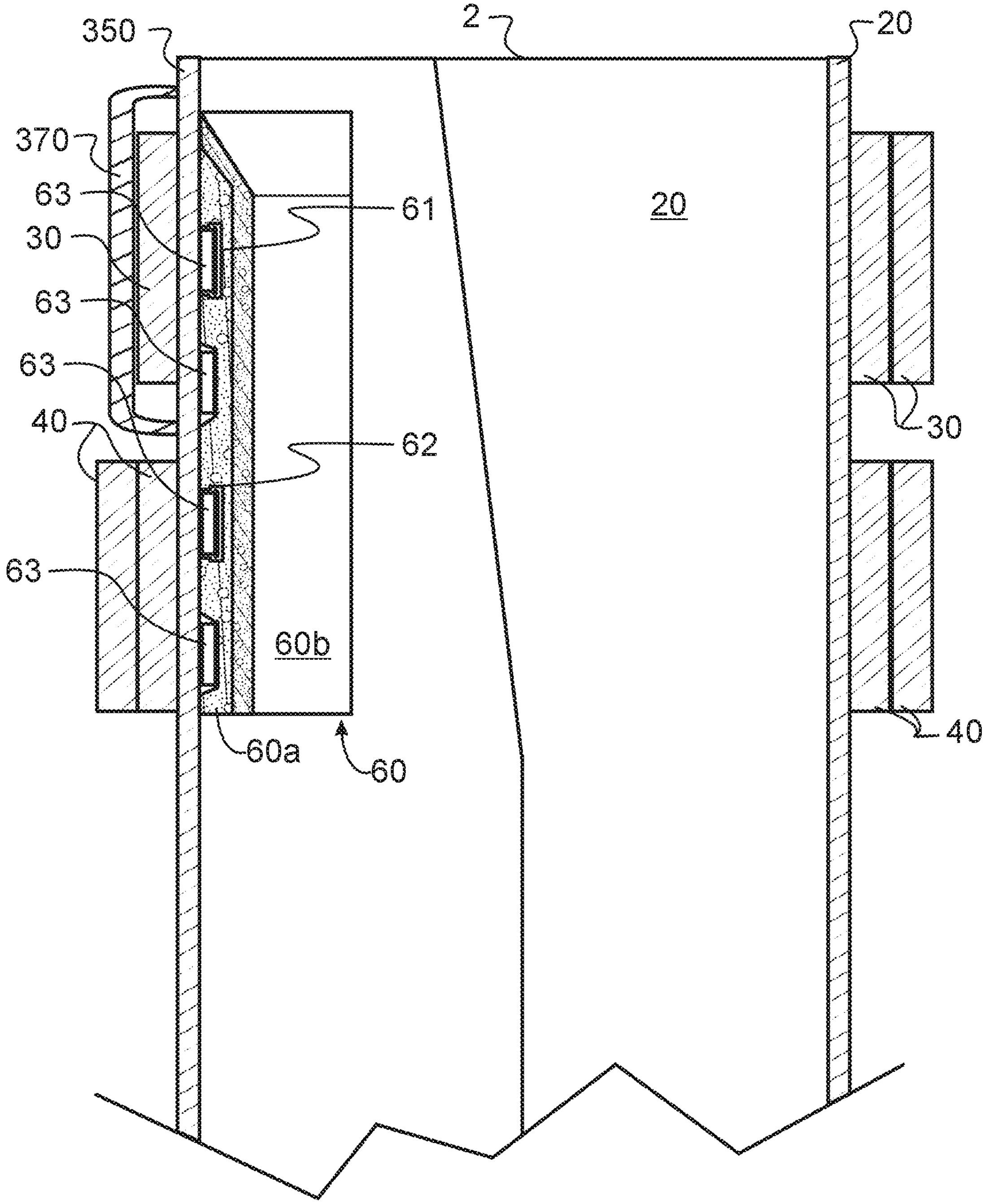
FIG. 40 illustrates a first alternative embodiment adjustable cushioning pad within the region of an exemplary dog boot adjacent the open upper end by enlarged sectional view similar to FIG. 39, but with even greater enlargement.

FIG. 40 illustrates a first alternative embodiment adjustable cushioning pad construction, where the fastener defined by threaded bolt 66 and female coupler 67 has been replaced by two female snaps 61, 62 that may be formed or otherwise affixed or adhered into foam core 60*a*. As illustrated, four separate male snap members 63 are provided that are operative to engage with and secure to female snaps 61, 62, though the exact number of male snaps is not critical to the present invention. Likewise, it is not critical which side houses the female snaps and which houses the male snaps, and these may be reversed if desired. Nevertheless, as illustrated female snap 61 is engaged with the top male snap 63, and female snap 62 is engaged with male snap 63 second from the top. If it is desired by a dog owner or other person to adjust the location of cushioning pad 60 closer to closed end 3, then these snaps will be separated, and female snap 61 will then be engaged with the male snap 63 adjacent to the top, and female snap 62 will be engaged with the lowermost male snap 63, most distal from open end 2. With more male snaps, finer adjustment of the position of cushioning pad 60 may be achieved.

As may be apparent, a wide range of engaging surfaces and optional fasteners and couplers may be used to facilitate adjustment and subsequent securing of cushioning pad 60 relative to open end 2 and closed end 3 of boot 1.

By using closed cell foam for cushioning pad 60, boot 1 has the ability to float in water, which is an advantage when a boot comes off the dog in water. Unfortunately, the effects of water, muck and the like may still exert forces that are greater than the boot can otherwise resist. Hook and loop fasteners or a similar product are used to make up the fastening system comprised by straps 30, 40.

From these foregoing figures, additional features and options become more apparent. First of all, the components disclosed herein may be manufactured from a variety of materials, including metals, resins and plastics, rubbers and other elastomers, ceramics or cementitious materials, composites, natural fibers or combinations or laminates of the above. The specific material used may vary depending upon a particular application and various cost and durability considerations, as well as other considerations that will be understood from the present disclosure or otherwise well-known and understood by those reasonably skilled in the art.

As may be understood, these preferred and alternative embodiment boots have many uses, including keeping a dog's feet clean when outside, to protect hunting dog's feet from thorns and burrs, and, when walking them, to protect dog's feet from chemicals and severe cold in the winter, and severe heat in the summer. Additionally, while the preferred embodiment describes application to dogs in accord with the requirement for enablement, those skilled in animal husbandry will recognize that the present invention will have application to other animals having similar paw and leg anatomy. Consequently, while the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A canine trail boot, comprising:

a boot top;

a sole coupled to said boot top to define a paw receiving space there between, wherein said sole further comprises:

a toe rising from said paw receiving space and having a plurality of unidirectional treads;

a tail rising from said paw receiving space; and said sole having five pad cups including four digital pad cups and a fifth metatarsal metacarpal pad cup;

each of said five pad cups having a cup base exterior surface that is configured to be in ground contact and an interior surface that is configured to be in contact with a dog's pad, a cup sidewall that rises vertically from said cup base and configured to be substantially out of contact with a flat ground surface and spaced in a portion adjacent to said ground surface by a void from a vertically rising side wall of an adjacent one of said five pad cups, and a flexible lug coupling said cup sidewall to said adjacent one of said five pad cups in a portion of the cup side wall distal to said cup base.

2. The canine trail boot of claim 1, said flexible lug is configured to be sufficiently pliable to permit each pad cup to move both up and down and side to side through at least a functional range effective to mimic independent pad motion in a dog that is relatively uninhibited by adjacent pad cups.

3. The canine trail boot of claim 2, wherein said flexible lug further comprises a sheet geometry.

4. The canine trail boot of claim 2, wherein each of said five pad cups are configured to receive a one of a dog's pads therein and said flexible lug is configured to separate each of said five pad cups and configured to allow flexure in said flexible lug to permit relative motion between each of said five pad cups during movement of said dog.

5. The canine trail boot of claim 2, wherein said sole further comprises:

said toe rising from a leading edge of said paw receiving space; and said tail rising from a trailing edge of said paw receiving space.

6. The canine trail boot of claim 1, further comprising:

a mid-base having an exterior configured for ground contact during locomotion, a leading portion that leads a trailing portion and which is distal on said mid-base relative to said trailing portion.

7. The canine trail boot of claim 1, wherein said flexible lug further comprises a generally planar sheet material.

8. The canine trail boot of claim 1, wherein said tail further comprises an omnidirectional tread.

9. The canine trail boot of claim 1, wherein said tail further comprises a pair of generally linear treads spaced from each other and configured to engage with a ground surface, and further configured to receive and retain a tensioned strap there between.

10. The canine trail boot of claim 1, wherein said toe unidirectional treads further comprise a right triangular prism geometry.

11. The canine trail boot of claim 1, wherein said toe unidirectional treads further comprise segmented treads.

* * * * *